(12) United States Patent
Isenhour et al.

(10) Patent No.: US 8,827,568 B1
(45) Date of Patent: Sep. 9, 2014

(54) FIBER OPTIC CONNECTOR ADAPTER MODULE ASSEMBLIES AND METHODS

(71) Applicants: Micah Colen Isenhour, Lincolnton, NC (US); Dennis Michael Knecht, Hickory, NC (US); James Phillip Luther, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/792,895

(22) Filed: Mar. 11, 2013

Related U.S. Application Data

(60) Provisional application No. 61/770,823, filed on Feb. 28, 2013.

(51) Int. Cl.
*G02B 6/36* (2006.01)
*G02B 6/46* (2006.01)
*G02B 6/38* (2006.01)

(52) U.S. Cl.
CPC .............. *G02B 6/46* (2013.01); *G02B 6/3825* (2013.01)
USPC ........................................................ 385/53

(58) Field of Classification Search
CPC .................................................. G02B 6/3825
USPC ..................................................... 385/53, 135
See application file for complete search history.

(56) References Cited

U.S. PATENT DOCUMENTS

| | | | |
|---|---|---|---|
| 5,881,191 A * | 3/1999 | Liberty | 385/58 |
| 6,467,971 B1 * | 10/2002 | Carberry et al. | 385/58 |
| 6,568,861 B2 * | 5/2003 | Benner et al. | 385/55 |
| 6,612,750 B1 * | 9/2003 | Bull et al. | 385/65 |
| 7,029,182 B2 * | 4/2006 | Ngo | 385/53 |
| 7,094,091 B2 * | 8/2006 | Grzegorzewska et al. | 439/354 |
| 7,740,408 B2 * | 6/2010 | Irisawa | 385/66 |
| 8,406,597 B2 * | 3/2013 | Case | 385/135 |
| 8,657,504 B2 * | 2/2014 | Wang et al. | 385/53 |
| 2010/0209063 A1 * | 8/2010 | Hoshino et al. | 385/135 |
| 2014/0023322 A1 * | 1/2014 | Gniadek | 385/56 |

* cited by examiner

Primary Examiner — Charlie Peng

(57) ABSTRACT

Fiber optic connector adapter module assemblies employing an engagement technique to install a fiber optic connector adapter module in an enclosure without tools are disclosed. In one embodiment, a fiber optic connector adapter module assembly includes a fiber optic connector adapter module having a plurality of first ports, and an adapter mount having an adapter opening. The adapter opening includes an insertion region and an installation region, wherein the insertion region and the installation region are shaped such that the insertion region is larger than the installation region. The fiber optic connector adapter module assembly may further include at least one retention mechanism coupled to the adapter mount. The installation region of the adapter mount and the retention mechanism cooperate to releasably lock the fiber optic connector adapter module in the insertion region upon rotation of the fiber optic connector adapter module into the installation region of the adapter opening.

9 Claims, 21 Drawing Sheets

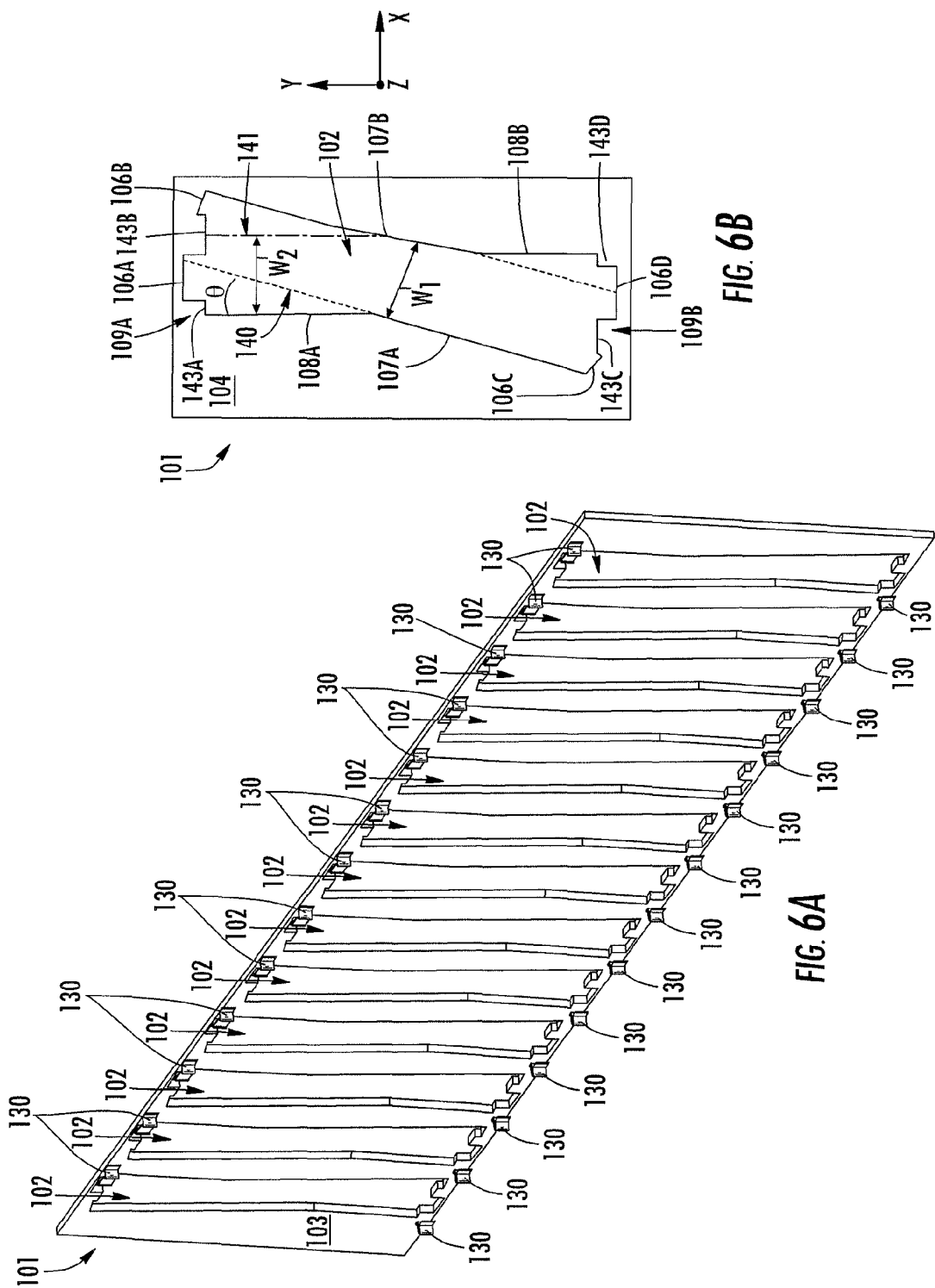

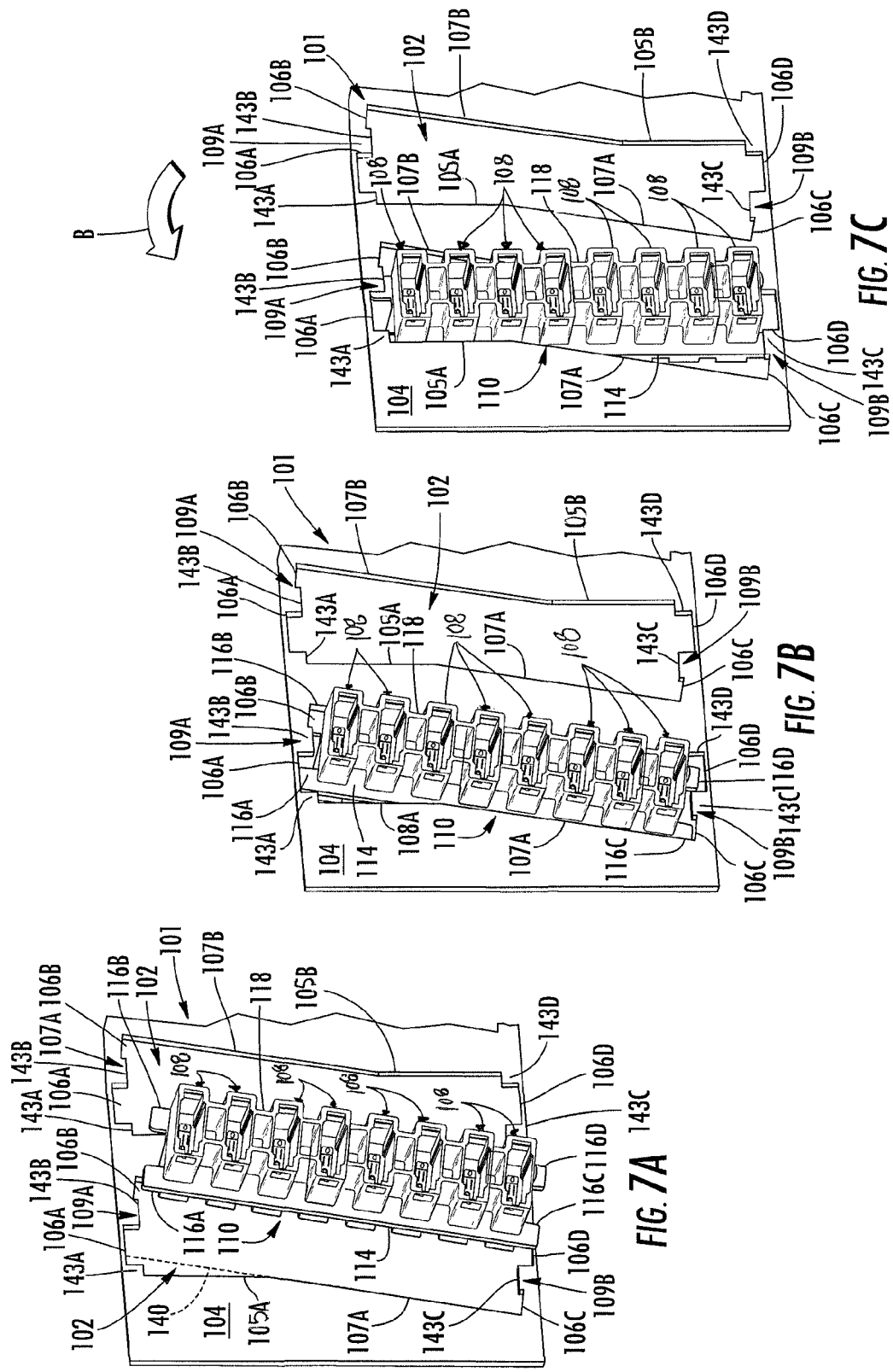

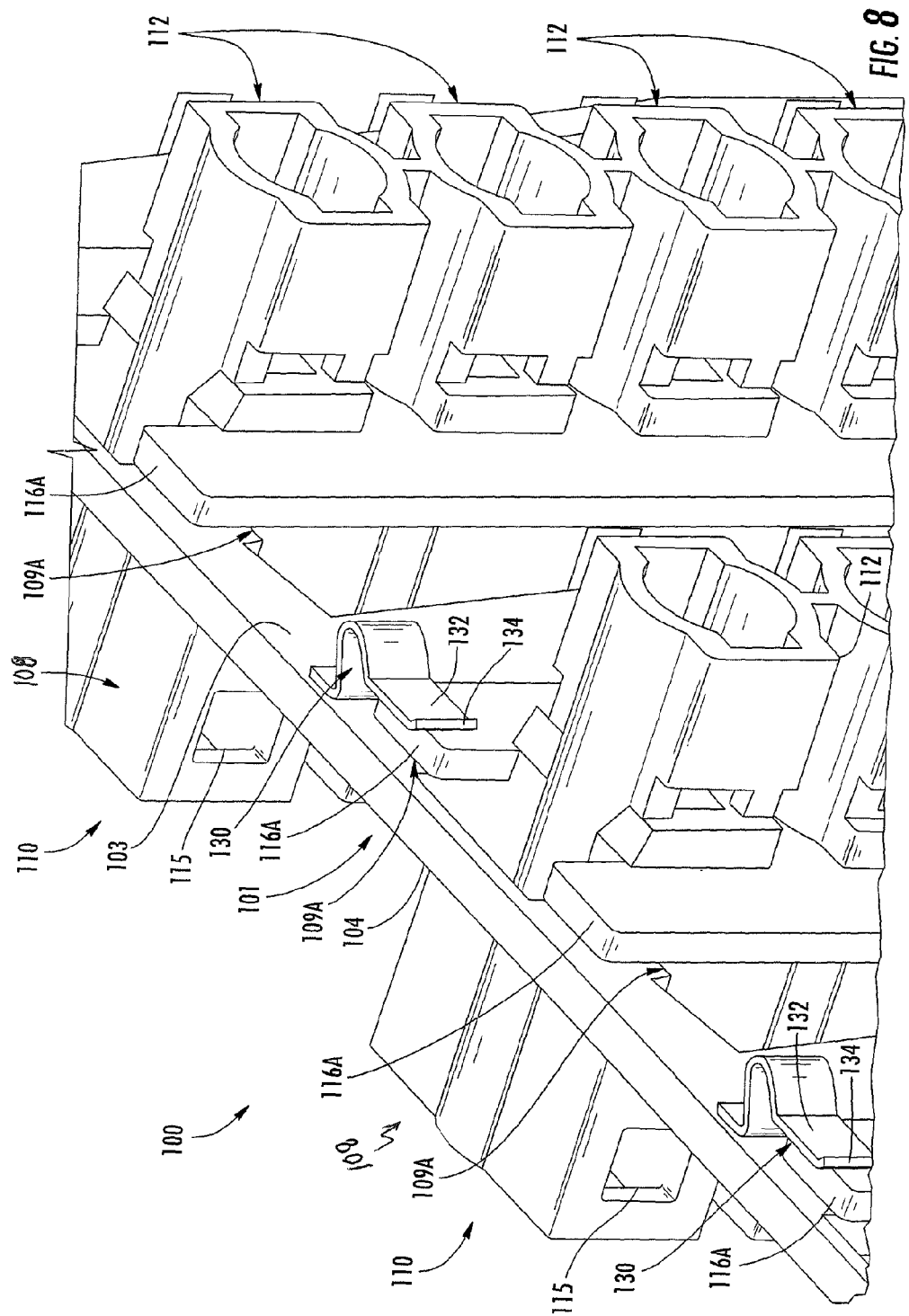

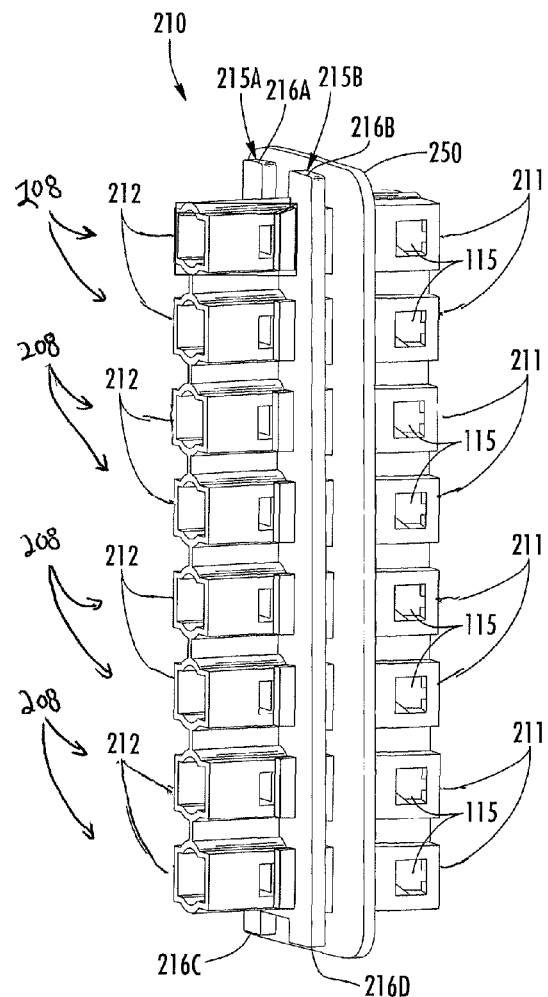
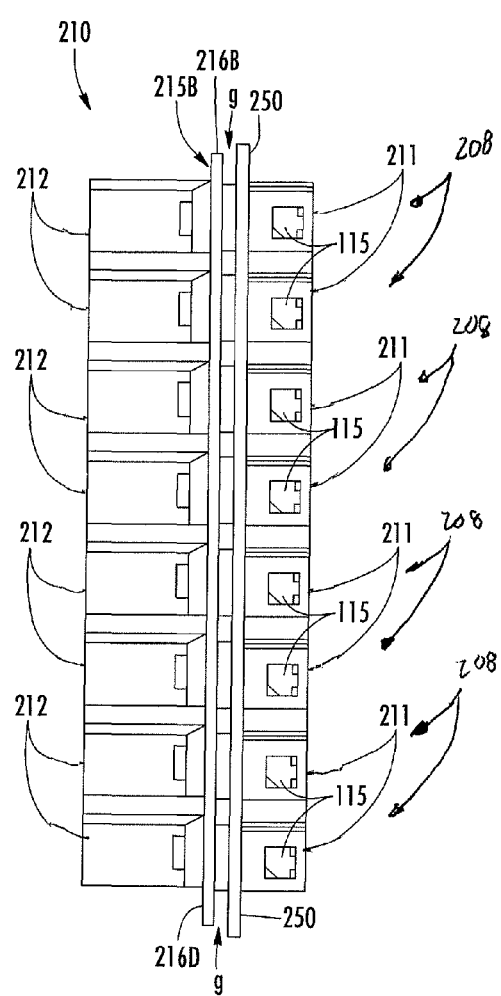
FIG. 9A
FIG. 9B

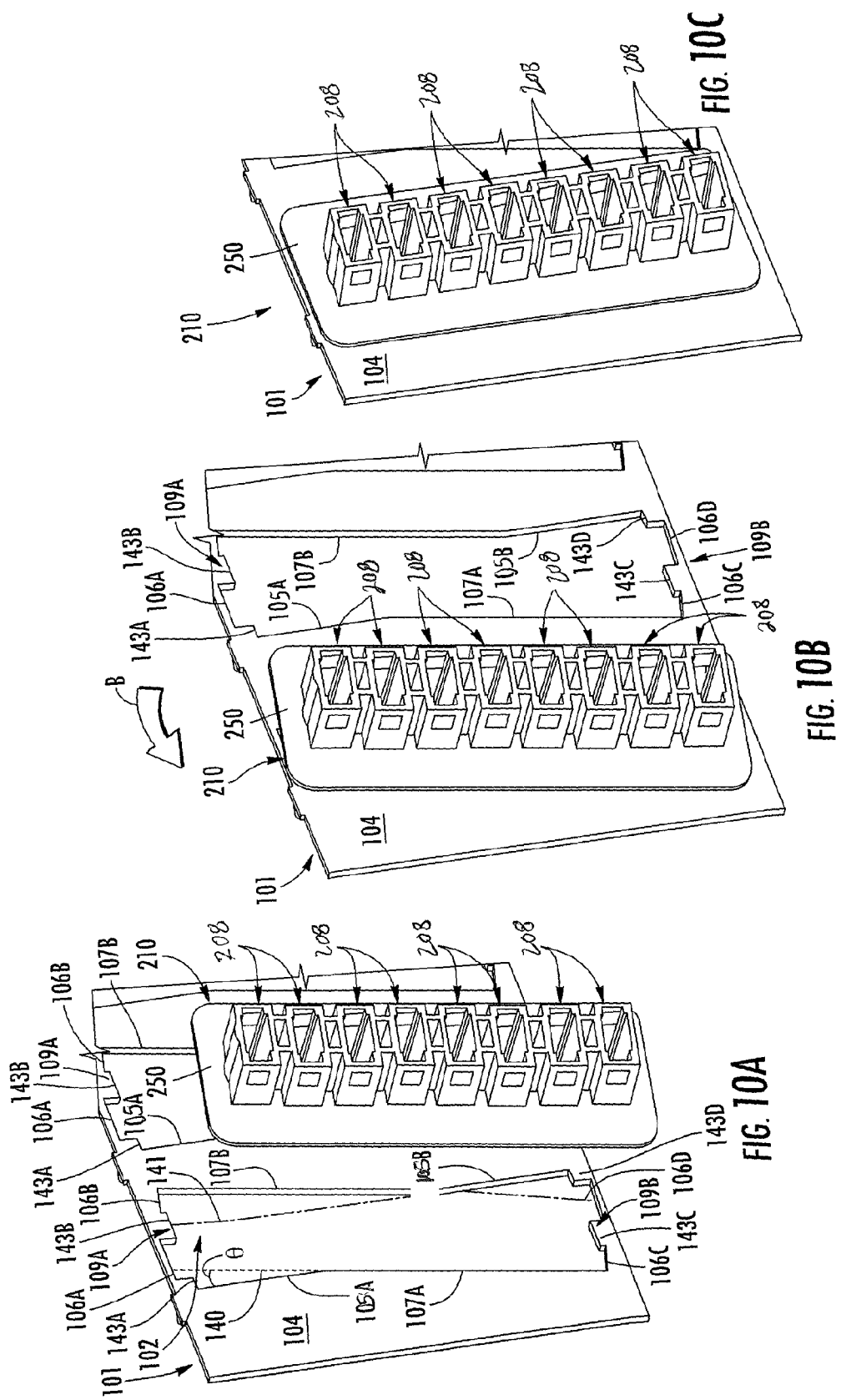

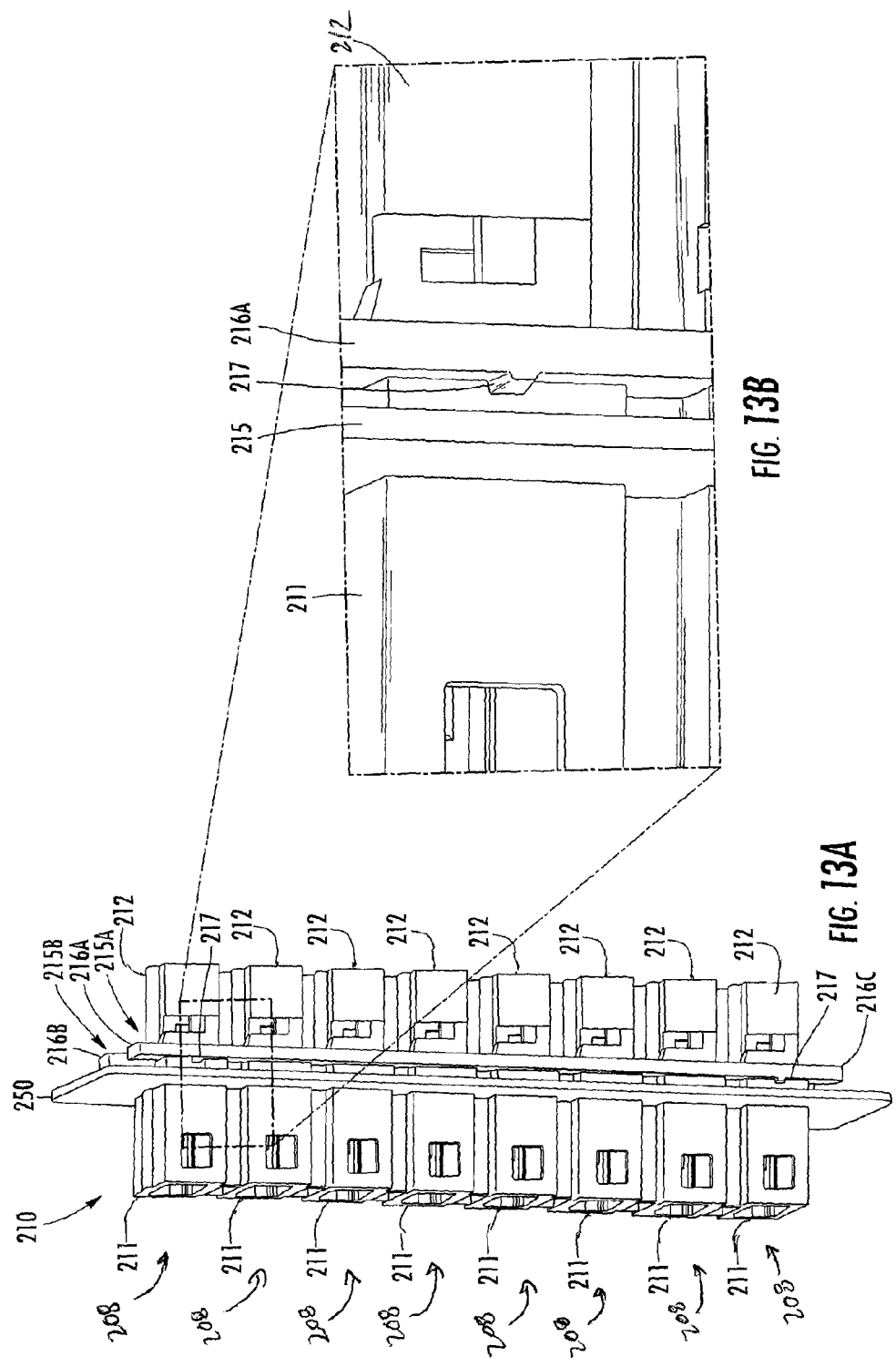

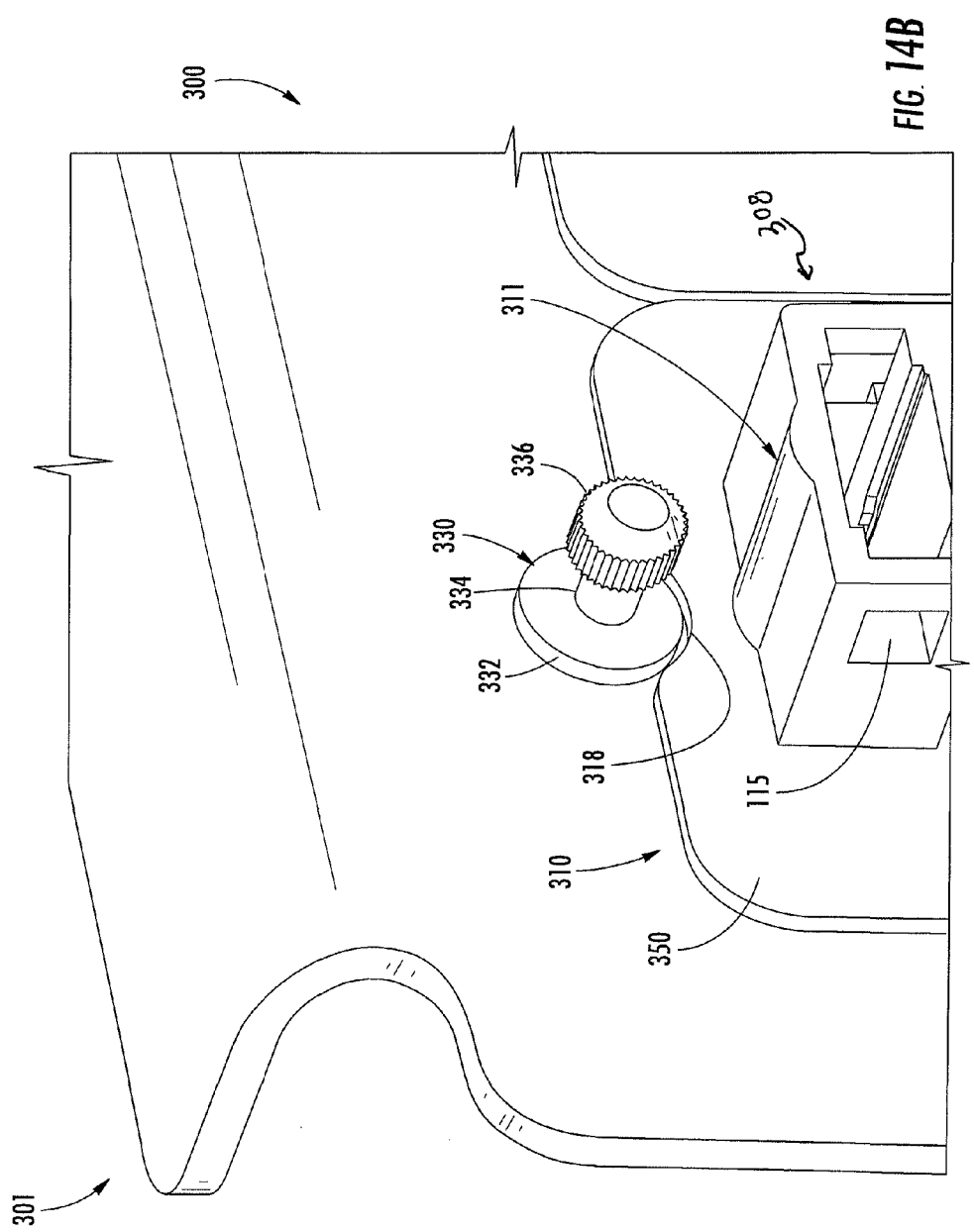

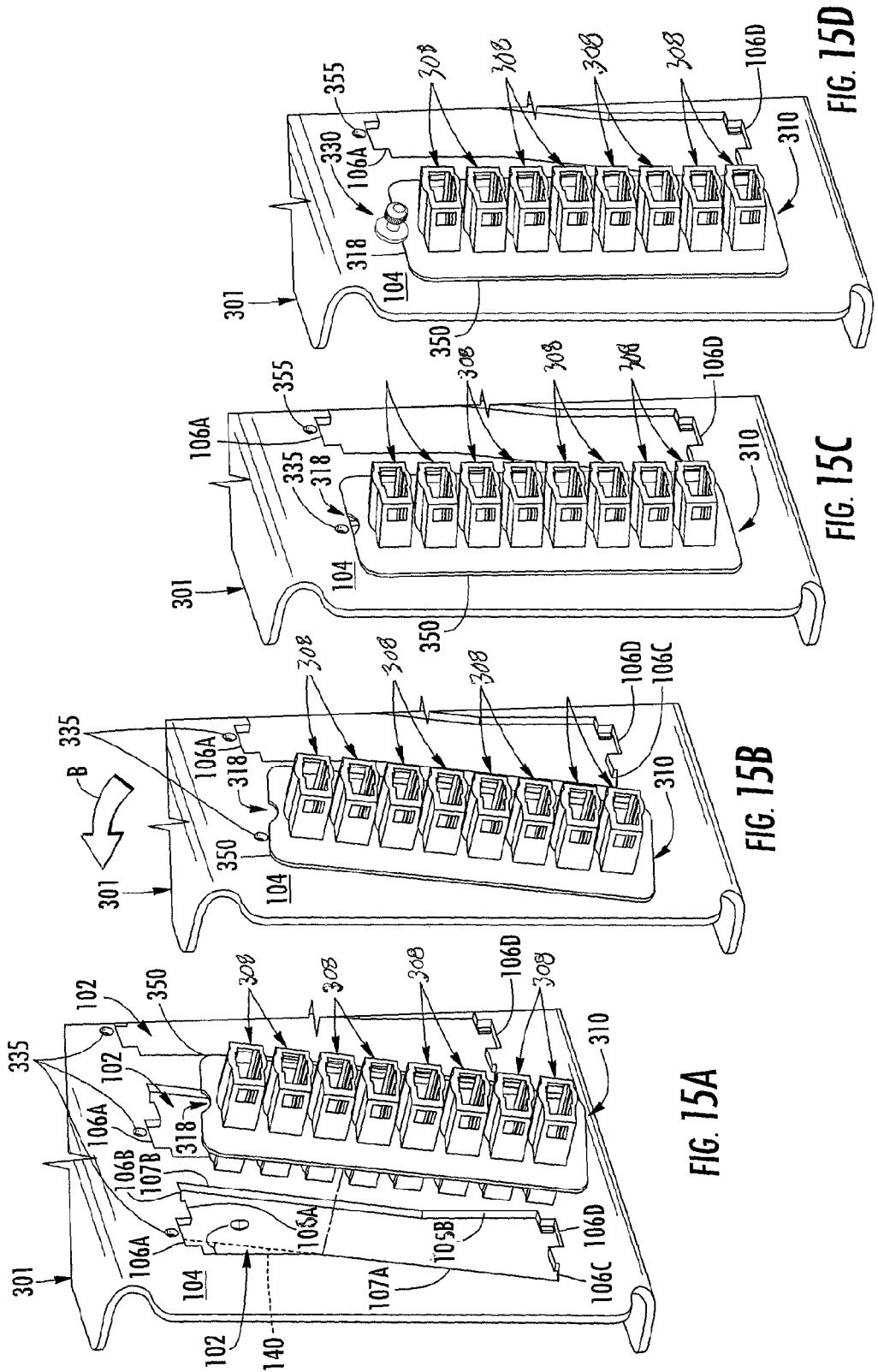

FIBER OPTIC CONNECTOR ADAPTER MODULE ASSEMBLIES AND METHODS

RELATED APPLICATIONS

This application claims the benefit of priority under 35 U.S.C. §119 of U.S. Provisional Application Ser. No. 61/770,823 filed on Feb. 28, 2013, the content of which is relied upon and incorporated herein by reference in its entirety.

BACKGROUND

1. Field of the Disclosure

The technology of the present disclosure relates to fiber optic connector adapter modules and, more particularly, to ganged fiber optic connector adapter module assemblies configured to be installed data center enclosures.

2. Technical Background

Benefits of optical fiber include extremely wide bandwidth and low noise operation. Connectors are often used in cable management systems to provide service connections to rack-mounted equipment and to provide inter-rack connections. Typical connectors for mating fiber optics include two connectors that are joined by an adapter. As one example of a connector, an MPO-style connector is a multi-fiber connector suitable for high-density backplane and printed circuit board (PCB) applications for data and telecom systems. MPO-style connectors generally utilize adapters, which align the MPO-style connectors with other multi-fiber connectors for forming a connection therebetween.

Fiber optic communication systems, such as fiber optic local area networks (LAN), for example, commonly include fiber optic data center equipment, such as racks, frames, sub-frames, or enclosures to provide for connection of a large number of connectorized optical fibers. In many applications, a large number of ports for receiving fiber optic connectors are provided in a single enclosure, which may be arranged according to a desired configuration. Assembly and/or reconfiguration of the ports in such data center equipment may be time consuming and costly.

SUMMARY OF THE DETAILED DESCRIPTION

Embodiments of the present disclosure allow for ganged fiber optic connector adapter module modules to be installed into a data center enclosure (e.g., a data center of a local area network ("LAN") or the like) without the use of tools, thereby potentially reducing installation time and cost. More specifically, a fiber optic connector adapter module module may include multiple ports configured to mate with one or more fiber optic connector styles. The fiber optic connector adapter module modules may convert a first fiber optic connector style to a second fiber optic connector style employed in the data center enclosure.

The multi-port fiber optic connector adapter module module may be installed into an adapter mount within the data center enclosure via an adapter mount located within the enclosure. According to the embodiments described herein, the fiber optic connector adapter modules may be installed in one or more adapter mounts without the need for tools by use of a twist and lock configuration. The adapter mount includes one or more adapter openings having an insertion region configured to accept a fiber optic connector adapter module, and an installation region configured to retain the fiber optic connector adapter module in the adapter mount. To install the fiber optic connector adapter module into the adapter mount, the fiber optic connector may be aligned with, and inserted into, the insertion opening of the adapter opening in the adapter mount. The fiber optic connector adapter module may then be moved into the installation region of the adapter opening where it contacts the adapter mount and may engage a retention mechanism to remain in place within the adapter mount.

In this regard, in one embodiment, a fiber optic connector adapter module assembly includes a fiber optic connector adapter module having a plurality of first ports, and an adapter mount having an adapter opening. The adapter opening includes an insertion region and an installation region, wherein the insertion region and the installation region are shaped such that the insertion region is larger than the installation region. The fiber optic connector adapter module assembly may include at least one retention mechanism coupled to the adapter mount, wherein the insertion region is configured to receive the fiber optic connector adapter module, and the installation region of the adapter mount and the at least one retention mechanism cooperate to releasably lock the fiber optic connector adapter module in the insertion region upon rotation of the fiber optic connector adapter module from the insertion region into the installation region of the adapter opening.

In another embodiment, a fiber optic connector adapter module assembly includes a fiber optic connector adapter module having a first end and a second end, and an adapter mount. The fiber optic connector adapter module includes a plurality of first ports, at least one first engagement feature extending from the first end of the fiber optic connector adapter module, and at least one second engagement feature extending from the second end of the fiber optic connector adapter module. The adapter mount includes a first surface, a second surface that is opposite from the first surface, an adapter opening, and at least one retention mechanism. The adapter opening includes an insertion region shaped to accept the fiber optic connector adapter module such that the at least one first engagement feature and the at least one second engagement feature may pass through the adapter opening, and an installation region shaped such that the at least one first engagement feature and the at least one second engagement feature contact the second surface of the adapter mount when the fiber optic connector adapter module is positioned within the installation region, thereby preventing the fiber optic connector adapter module from passing through the adapter opening. The at least one retention mechanism is configured to retain the fiber optic connector adapter module in the installation region of the adapter mount.

In yet another embodiment, a method of installing a fiber optic connector adapter module in a data center enclosure includes positioning a fiber optic connector adapter module into an insertion region of an adapter opening provided in an adapter mount within the data center enclosure, wherein the insertion region of the adapter opening is larger than an area of the fiber optic connector adapter module, and moving the fiber optic connector adapter module within the adapter opening to transition the fiber optic connector adapter module from the insertion region of the adapter opening to an installation region of the adapter opening, wherein the installation region is smaller than the area defined by the area of the fiber optic connector adapter module. The method further includes engaging at least a portion of the fiber optic connector adapter module with at least one retention mechanism that releasably retains the fiber optic connector adapter module in the installation region of the adapter opening.

In yet another embodiment, a fiber optic connector adapter module assembly includes a fiber optic connector adapter module and an adapter mount. The fiber optic connector adapter module includes a first edge and a second edge, a plurality of first ports, a plurality of first engagement tabs disposed along the first edge of the fiber optic connector adapter module, and a plurality of second engagement tabs disposed along the second edge of the fiber optic connector adapter module. The fiber optic connector adapter module further includes an engagement plate that is offset from the plurality of first engagement tabs and the plurality of second engagement tabs. The adapter mount includes an adapter opening dimensioned to accept the fiber optic connector adapter module. The adapter opening includes a first edge defined by a plurality of first alternating tabs and notches, and a second edge defined by a plurality of second alternating tabs and notches. Individual notches of the plurality of first alternating tabs and notches are configured to accept individual engagement tabs of the plurality of first engagement tabs, and individual notches of the plurality of second alternating tabs and notches are configured to accept individual engagement tabs of the plurality of second engagement tabs when the fiber optic connector adapter module is positioned in an insertion region of the adapter opening. Individual tabs of the plurality of first alternating tabs and notches are configured to be disposed between individual engagement tabs of the plurality of first engagement tabs and the engagement plate of the fiber optic connector adapter module when the fiber optic connector adapter module is positioned in an installation region of the adapter opening. Individual tabs of the plurality of second alternating tabs and notches are configured to be disposed between individual engagement tabs of the plurality of second engagement tabs and the engagement plate of the fiber optic connector adapter module when the fiber optic connector adapter module is positioned in the installation region of the adapter opening.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A is a rear perspective view of an exemplary adapter mount of the fiber optic connector adapter module assembly depicted in FIG. 1;

FIG. 6B is a partial front view of an adapter opening of the adapter mount depicted in FIG. 6A;

FIGS. 7A-7C are perspective views of an installation of a fiber optic connector adapter module into an adapter mount according to one or more embodiments described and illustrated herein;

FIG. 8 is a close-up, top perspective view of fiber optic connector adapter modules retained in an adapter mount by spring clip retention mechanisms according to one or more embodiments described and illustrated herein;

FIG. 9A is a side perspective view of a fiber optic connector adapter module having an engagement plate according to one or more embodiments described and illustrated herein;

FIG. 9B is a side view of the fiber optic connector adapter module depicted in FIG. 9A;

FIGS. 10A-10C are perspective views of an installation of the fiber optic connector adapter module depicted in FIGS. 9A and 9B into an adapter mount according to one or more embodiments described and illustrated herein;

FIG. 13A is a side perspective view of a fiber optic connector adapter module having engagement features with rib features according to one or more embodiments described and illustrated herein;

FIG. 13B is a close-up view of a rib feature of the fiber optic connector adapter module depicted in FIG. 13A;

FIG. 14B is a close-up view of a locking peg of the fiber optic connector adapter module assembly depicted in FIG. 14A;

FIGS. 15A-15D are perspective views of an installation of the fiber optic connector adapter module into the adapter mount depicted in FIG. 14A;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein relate to fiber optic connector adapter module assemblies used in applications that include, but are not limited to, optical data center applications. More particularly, embodiments described herein may include one or more adapter mounts having a plurality of adapter openings for receiving one or more fiber optic connector adapter modules comprising an array of fiber optic connector adapters. The adapter mount(s) may be disposed in a data center enclosure to assist in the connection of fiber optic connectors for fiber optic data communication using light signals. Each adapter may include a plurality of fiber optic connectors of one or more styles to allow fiber optic connectors of fiber optic cable assemblies to be optically coupled to an optical network via the data center enclosure. For example, each adapter may include a plurality of MPO-style connector receptacles for receiving a plurality of optical cable assemblies having an MPO-style connector. It is noted that although embodiments are illustrated herein being directed to MPO-style connectors, embodiments are not limited thereto. The fiber optic connector adapter module assemblies described herein may be configured for other fiber optic connector styles.

As described in more detail below, embodiments allow for quick insertion of fiber optic connector adapter modules into a data center enclosure without the need for tools. The adapter mount may be installed in a data center enclosure (or other hardware) and allow for fiber optic connector adapter modules to be inserted by a twist-and-lock motion or a lateral translation motion. More specifically, the adapter mount includes a plurality of adapter openings having an insertion region that is dimensioned such that the fiber optic connector adapter module may pass through the adapter mount, and an installation region that is dimensioned such that the fiber optic connector adapter module is retained within the adapter mount upon movement from the insertion region to the installation region. Installation time and costs may be reduced because of the fiber optic connector adapter modules may be installed without the use of tools. Various embodiments of fiber optic connector assemblies and methods including twist-and-lock and linear insertion methods are disclosed in detail below.

Figure 1:
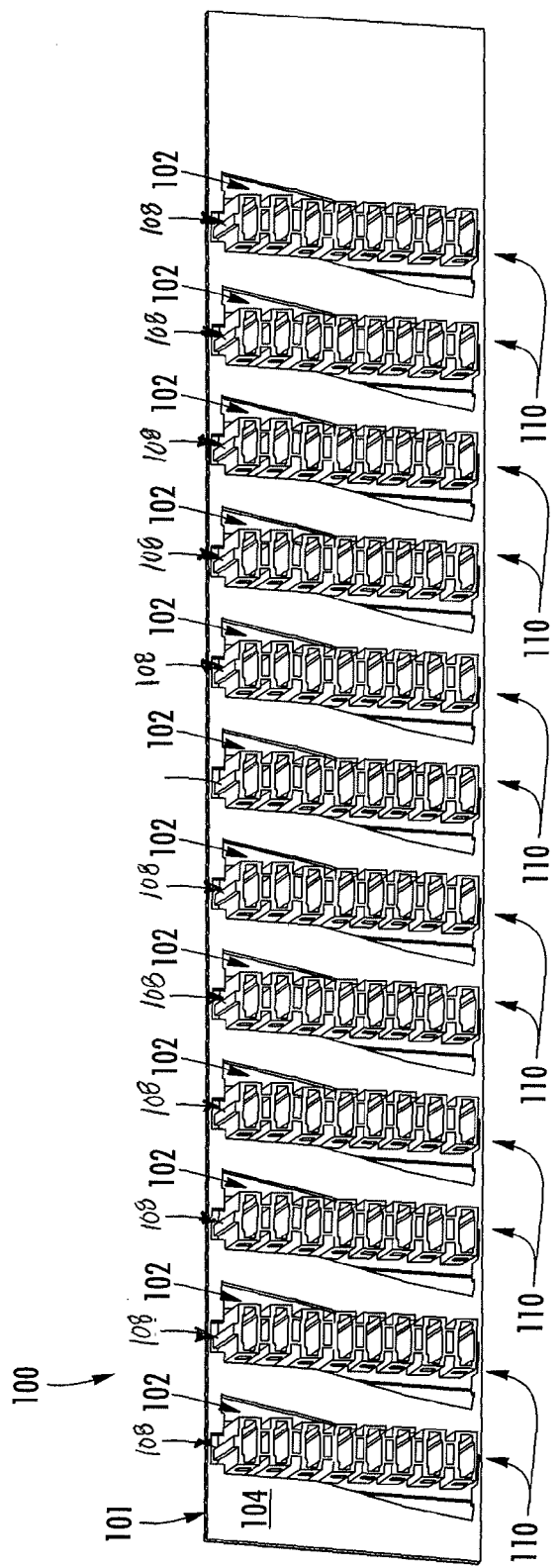
FIG. 1 is a front perspective view of an exemplary fiber optic connector adapter module assembly according to one or more embodiments described and illustrated herein.

Referring now to FIG. 1, a fiber optic connector adapter module assembly 100 according to one embodiment is illustrated. The fiber optic connector adapter module assembly 100 generally includes an adapter mount 101 and a plurality of fiber optic connector adapter modules 110 that are installed in adapter openings 102 of the adapter mount 101. The adapter mount 101 may be disposed in a data center enclosure (not shown), for example, to provide for optical connection of coupled optical cable assemblies to a data network (e.g., a local area network ("LAN")). The fiber optic connector adapter modules 110, each of which includes an array of fiber optic connector adapters 108, are retained within the adapter openings 102 of the adapter mount 101. As described in more detail below, the fiber optic connector adapter modules 110 are installed by positioning the fiber optic connector adapter module 110 in an insertion region of the adapter opening 102, and then rotating the fiber optic connector adapter module 110 into an installation region of the adapter opening 102 where it is releasably retained by a retention mechanism.

Figure 2:
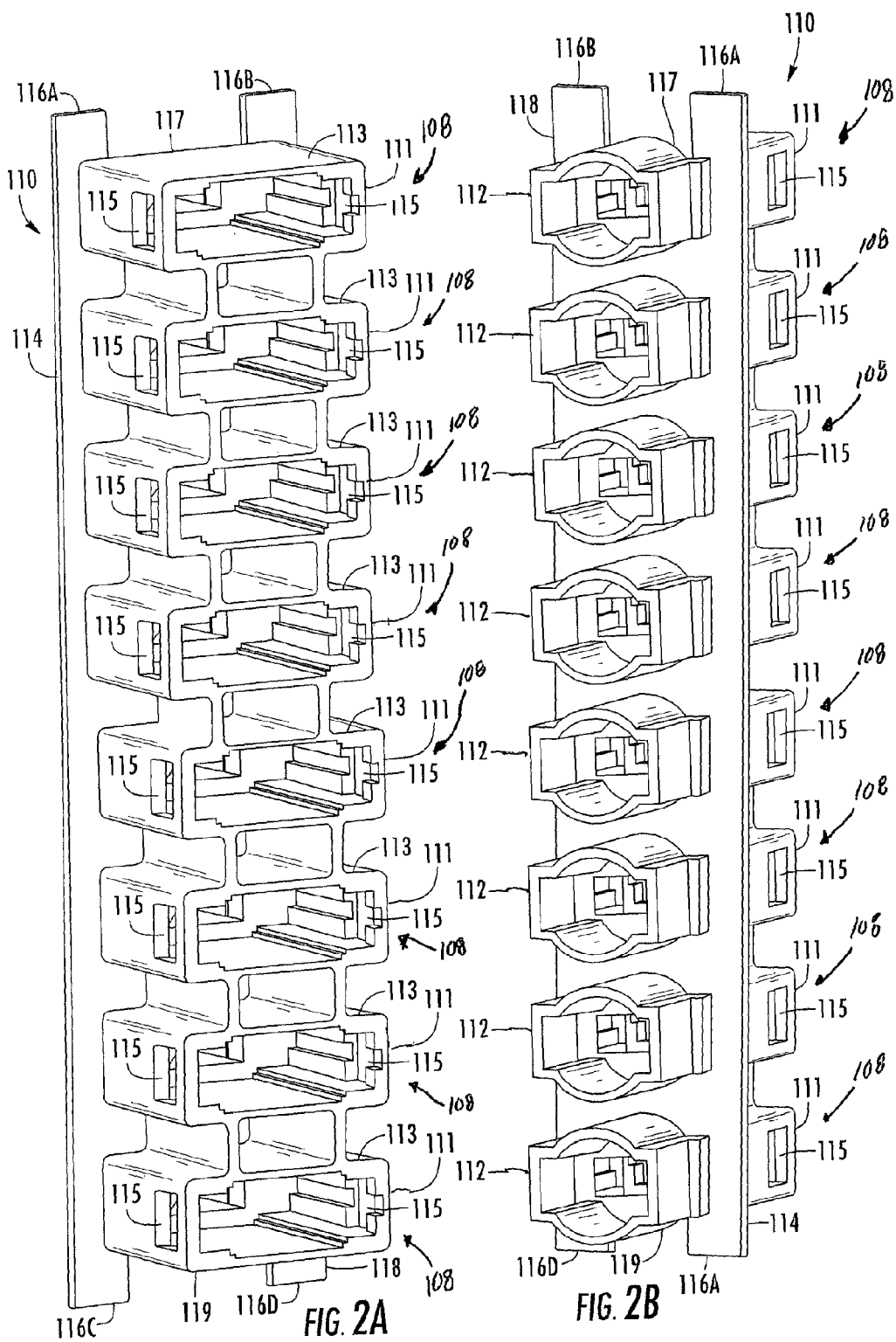
FIG. 2A is a front perspective view of a fiber optic connector adapter module of the exemplary fiber optic connector adapter module assembly depicted in FIG. 1.
FIG. 2B is a rear perspective view of the fiber optic connector adapter module depicted in FIG. 2A.

FIGS. 2A and 2B depict a first side and a second side of an exemplary fiber optic connector adapter module 110, respectively. The fiber optic connector adapter module 110, which may be fabricated from a rigid material, such as molded plastic, includes an array of fiber optic connector adapters 108 including a plurality of first ports 111 (FIG. 2A) and a plurality of second ports 112 (FIG. 2B). The plurality of first ports and the plurality of second ports may define a plurality of port pairs. Referring first to FIG. 2A, the first ports 111 have a body 113 that are shaped to form an opening configured to releasably receive an MPO-style fiber optic connector 163 (see FIGS. 4 and 5). The first ports 111 may be configured to receive other fiber optic connector styles (e.g., SC or LC). Although the illustrated fiber optic connector adapter module 110 is depicted as having eight first ports 111, embodiments are not limited thereto.

Optionally, fiber optic connector adapter modules 110 of the present disclosure may further include at least one reinforcement member 120 disposed between adjacent first ports 111. The at least one reinforcement member 120 may be connected to adjacent first ports 111 to strengthen the fiber optic connector adapter module 110 by stiffening each first port 111. Accordingly, the at least one reinforcement members 120 may minimize any deflection, and therefore the amount of torque experienced by the first ports 111, under optical cable assembly loads caused by coupled fiber optic connectors 163.

In the illustrated embodiment, the at least one reinforcement member 120 comprises two equally spaced reinforcement members 120. However, in alternative embodiments, a single, centrally positioned reinforcement member 120 may be provided. Further, more than two reinforcement members 120 may be provided. Although not shown in FIG. 2B, one or more reinforcement members may be disposed between adjacent second ports 112. Such second port reinforcement members may be configured as the first port reinforcement members 120 depicted in FIG. 2A, for example.

The illustrated fiber optic connector adapter module 110 comprises engagement features 116A-116D that are configured to contact the adapter mount 101 when the fiber optic connector adapter module 110 is positioned in the installation region of the adapter opening 102, as described below. When the fiber optic connector adapter module 110 is positioned in the installation region of the adapter opening 102, the engagement features 116A-116D are pressed against the adapter mount.

In the illustrated embodiment, the fiber optic connector adapter module 110 has a first engagement feature extending from a first end 117, and a second engagement feature extending from a second end 119. The first engagement feature is configured as a first tab 116A at a first edge 114 and extending from the first end 117 of the fiber optic connector adapter module 110, and a second tab 116B at a second edge 118 and extending from the first end 117 of the fiber optic connector adapter module 110. The second engagement feature is configured as a third tab 116C at the first edge 114 and extending from the second end 119 of the fiber optic connector adapter module 110, and a fourth tab 116D at the second edge 118 and extending from the second end 119 of the fiber optic connector adapter module 110. It should be understood that embodiments are not limited to number and configuration of the engagement features 116A-116D depicted in the figures. For example, in an alternative embodiment, the first engagement feature may be configured as a single tab extending from the center of the first end 117 of the fiber optic connector adapter module 110, and the second engagement feature may be configured as a single tab extending from the center of the second edge 119 of the fiber optic connector adapter module 110. Other configurations are also possible.

Referring now to FIG. 2B, the fiber optic connector adapters 108 of the illustrated fiber optic connector adapter module 110 includes a plurality of second ports 112 opposing the plurality of first ports 111 to form a plurality of port pairs. The second ports 112 may face the interior of the data center enclosure when the fiber optic connector adapter module 110 is installed in the adapter mount 101, and be configured to receive a fiber optic connector that is to be coupled to the first fiber optic connector.

Figure 3:
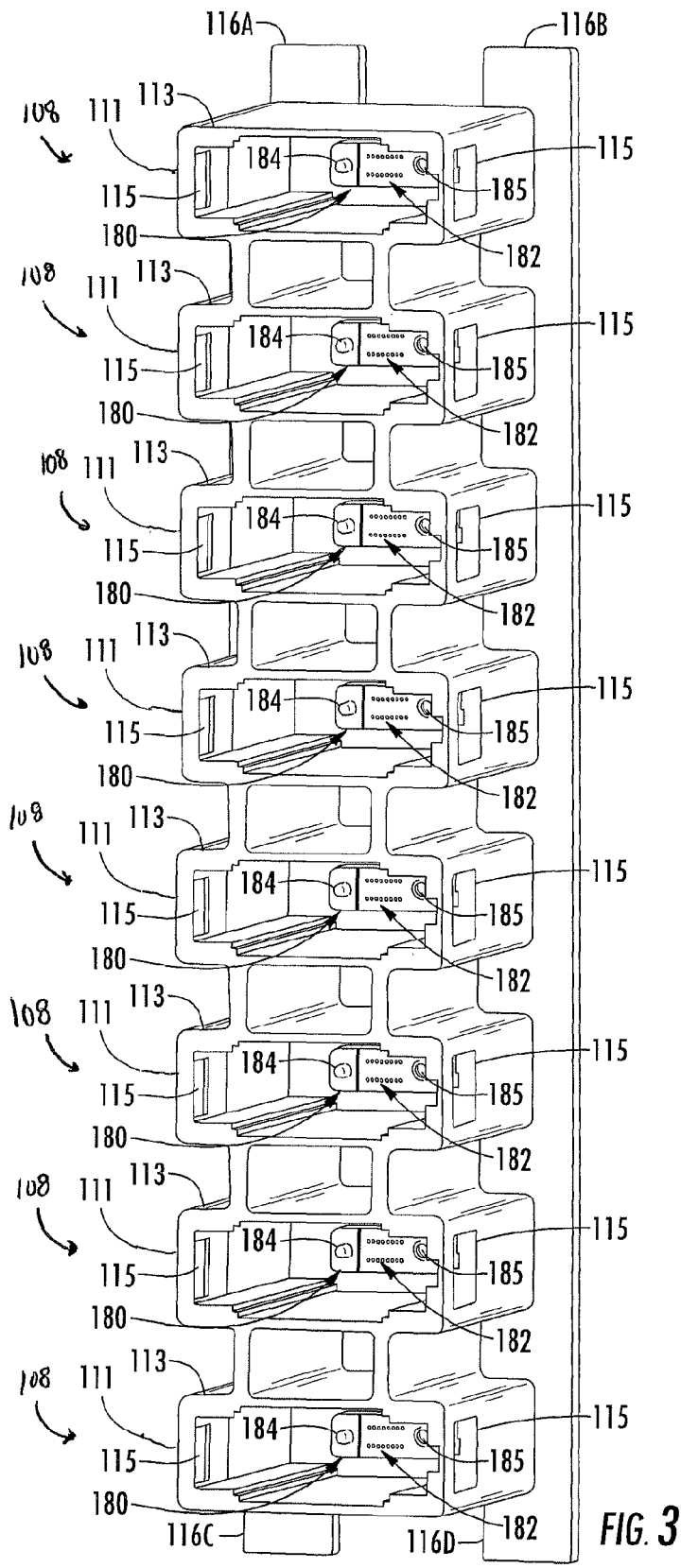
FIG. 3 is a front perspective view of the fiber optic connector adapter module depicted in FIG. 2A further including a ferrule element.

A ferrule element 180 may be disposed within each first port 111 (and/or second port 112), as shown in FIG. 3. The ferrule element 180 may take on a variety of configurations, and embodiments are not limited to the configuration of the ferrule assemblies depicted herein. As such, the ferrule element 180 is provided for illustrative purposes only. In the illustrated embodiment, the ferrule element 180 comprises an optical interface 182 that is defined by an array of lens elements, which are optically coupled to fiber optic components (not shown), such as optical fibers or waveguides extending toward a rear opening of the second port 112 (see FIG. 5). The lens elements may be configured as refractive lenses, diffractive lenses, gradient-index ("GRIN") lenses and the like, and be positioned to be optically coupled to mated lenses of the fiber optic connector inserted into a first port 111. The optical interface 182 may be positioned at a rear end of the enclosure defined by the body 113 of the first port 111. As described below with respect to FIG. 5, the ferrule element 180 may be configured to translate within the first port 111 and/or the second port 112.

The illustrated ferrule element 180 includes mechanical coupling features that are configured to mate with corresponding mechanical coupling features of a ferrule element of a fiber optic connector 163. The exemplary mechanical coupling features of the illustrated embodiment comprise an alignment pin 184 and an alignment bore 185. The alignment pin 184 may be inserted into an alignment bore of the fiber optic connector 163, and the alignment bore may receive an alignment pin from the fiber optic connector 163.

Figure 4:
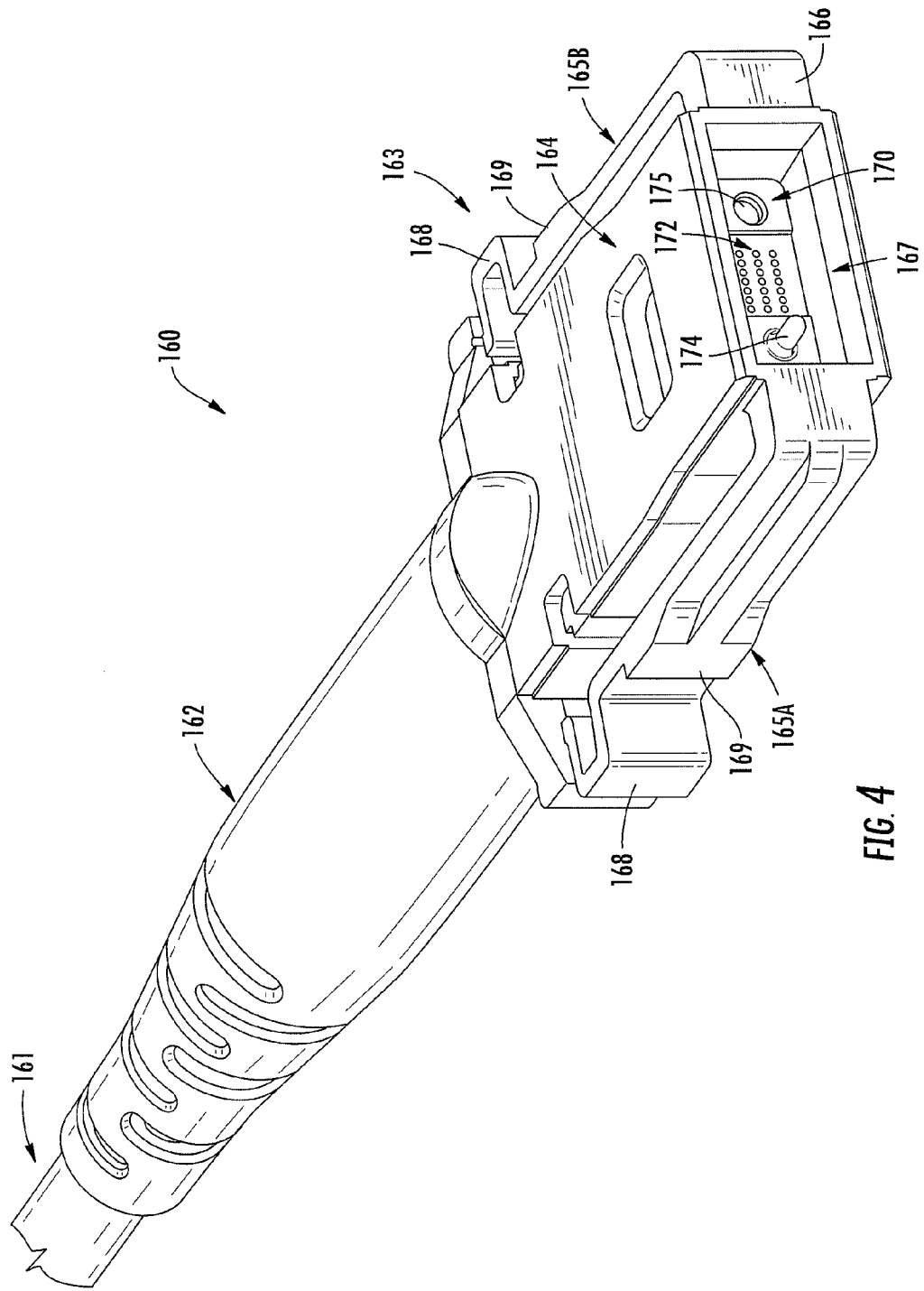
FIG. 4 is a top, front perspective view of an exemplary optical cable assembly configured to mate with the fiber optic connector adapter module depicted in FIG. 2A.

Referring now to FIG. 4, an exemplary optical cable assembly 160 having a fiber optic connector 163 configured to be inserted into one of the first ports 111 of the fiber optic connector adapter module 110 is depicted. It should be understood that the fiber optic connector 163 is provided for illustrative purposes only, and that embodiments are not limited to any type or configuration of fiber optic connector. The optical cable assembly 160 generally includes a fiber optic cable 161 that is coupled to a fiber optic connector 163 that is configured as a plug. The fiber optic cable 161 may include an outer jacket that surrounds and protects a plurality of optical fibers configured to optical transmission of optical signals. A strain relief element 162 may also be provided to protect the plurality of optical fibers from external forces applied to the optical cable assembly 160. The fiber optic connector 163 generally comprises a plug body 164 that defines a ferrule enclosure into which a recessed ferrule element 170 is disposed. Having the ferrule element 170 recessed within the plug body 164 protects the lens elements of the ferrule element 170 from damage.

The ferrule element 170 is configured to optically and mechanically mate with a ferrule element 180 of the fiber optic connector adapter module 110. In the illustrated, non-limiting example, the ferrule element 170 of the fiber optic connector 163 includes an optical interface 172 comprising an array of lens elements (which may be optically coupled to optical elements, such as optical fibers or waveguides). As described above, the lens elements may be configured as refractive lenses, diffractive lenses, GRIN lenses, and the like. The ferrule element 170 further includes an alignment pin 174 and an alignment bore 175 configured to mate with the alignment bore 185 and the alignment pin 184 of the ferrule element 180 within the fiber optic connector adapter module 110, respectively.

The exemplary fiber optic connector 163 includes a plug body opening 167 at an insertion surface 166, which is the surface of the plug body 164 that is inserted into the first port 111. The plug body opening 167 is configured to receive the mated ferrule element 180 the fiber optic connector 163 is coupled to the first port 111.

In the illustrated embodiment, the plug body 164 comprises a first latching arm 165A and a second latching arm 165B that extend from the insertion surface 166 and are offset from a main portion of the plug body 164. Although two latching arms are depicted, it should be understood that more or fewer may be provided in alternative embodiments. The illustrated first and second latching arms 165A, 165B include a detent 169 that act as a locking mechanism that is configured to engage openings 115 of the first port 111 when the fiber optic connector 163 is inserted into the first port 111. The first and second latching arms 165A, 165B may include a release tab 168 at an end that is distal from the insertion surface 166. The first and second latching arms 165A, 165B are compliant in a direction transverse to the insertion direction upon application of force applied to the release tabs 168.

Figure 5:
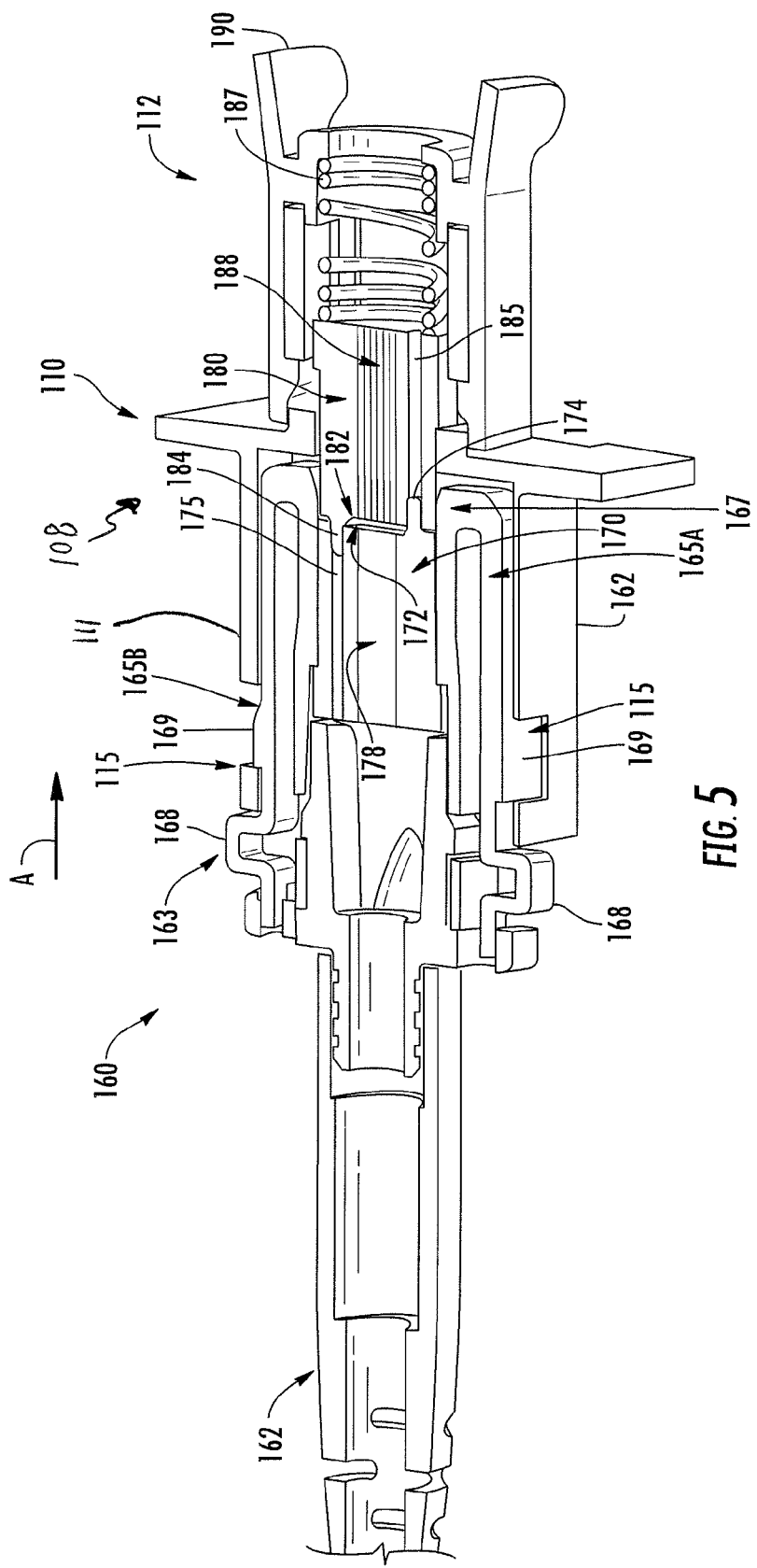
FIG. 5 is a cut-away perspective view of the optical cable assembly depicted in FIG. 4 mated with a port of the fiber optic connector adapter module depicted in FIG. 3.

FIG. 5 depicts a cross-sectional view of the exemplary fiber optic connector 163 inserted into a first port 111 of a fiber optic connector adapter module 110. Optical fibers are not shown in FIG. 5 for clarity and ease of illustration. The ferrule element 180 within the first port 111 ("port ferrule element") in the illustrated embodiment is biased from an enclosure defined by the second port 112 toward an enclosure defined by the first port 111 by a bias member 187. The bias member 187 may be configured as a spring, for example. Accordingly, the port ferrule element 180 may translate within the fiber optic connector adapter module 110 upon insertion and removal of the fiber optic connector 163. The bias member 187 is maintained within the enclosure defined by the second port 112 by a clip element 190 in the illustrated embodiment. Other configurations are also possible.

The ferrule element 170 within the enclosure defined by the fiber optic connector 163 ("plug ferrule element") mates with the port ferrule element 180 when the fiber optic connector 163 is inserted into the first port 111 in a direction indicated by arrow A. As shown in FIG. 5, the plug ferrule element 170 and the port ferrule element 180 may each include fiber bores 178, 188 in which optical fibers (or waveguides and/or other optical components) may be disposed. The optical fibers (not shown) may terminate at the respective optical interface 172, 182, or terminate at some other optical components within the plug ferrule element 170 and the port ferrule element 180 (e.g., GRIN lenses or waveguides).

The fiber optic connector 163 may be inserted into the first port 111 until the detents 169 of the first and second latching arms 165A, 165B are positioned in the openings of the body 113 of the first port 111. The alignment pin 174 of the plug ferrule element 170 is inserted into the alignment bore 185 of the port ferrule element 180, and the alignment pin 184 of the port ferrule element 180 is inserted into the alignment bore 175 of the plug ferrule element 170. In this manner, the alignment pins 174, 184 and the alignment bores 175, 185 provide fine alignment of the lens elements of the two coupled optical interfaces 172, 182. The plug ferrule element 170 may push the port ferrule element 180 along direction A such that the bias member 187 applies a force on the plug ferrule element 170 to maintain optical coupling between the optical interfaces 172, 182.

It should be understood that other connectors and coupling configurations may be provided, and that the embodiments depicted in at least FIGS. 4 and 5 are used merely as examples.

Referring now to FIG. 6A, a second surface 103 (i.e., rear surface that faces the internal components of the data center enclosure) of an adapter mount 101 according to one embodiment is illustrated. The adapter mount 101, which may be fabricated from any suitably rigid material, such as metal, includes a plurality of adapter openings 102 into which a plurality of fiber optic connector adapter modules 110 may be inserted. The number of adapter openings 102 may depend on the type and/or area of the data center enclosure the adapter mount 101 is to be installed. The illustrated adapter mount 101 includes 13 adapter openings 102; however, more or fewer adapter openings 102 may be included. The adapter mount 101 may be configured to be installed in a data center enclosure by any number of methods. The attachment method may depend on the end application.

Each adapter opening 102 may have at least one retention mechanism associated therewith. The retention mechanism is configured to retain the fiber optic connector adapter module 110 in the installed position within the adapter opening 102. In the illustrated embodiment, the retention mechanism is configured as two spring clips 130. One spring clip 130 is located proximate a first, top end of the adapter opening 102, while another spring clip is located proximate a second, bottom end of the adapter opening 102. The spring clips 130 of the illustrated embodiment are located on opposite sides of the adapter opening 102. The spring clips 130 may be fabricated from metal, for example, and be coupled to the second surface 103 of the adapter mount 101 by any appropriate means (e.g., welding, adhesive, solder, fasteners, and the like). It should be understood that the spring clips 130 may be made of materials other than metals. The retention mechanism(s) may take on other configurations, as described in more detail below.

FIG. 6B is a close-up view of a single adapter opening 102. As stated above, the adapter opening 102 comprises an insertion region 140 and an installation region 141. The insertion region 140 is larger than the installation region 141, and is dimensioned to accept the fiber optic connector adapter module 110. In other words, at least a portion of the fiber optic connector adapter module 110 may pass through the adapter opening 102 at the insertion region 140. The insertion and installation process according to one embodiment is described below with reference to FIGS. 7A-8. The insertion region 140 is angled with respect to the installation region 141, which is aligned with the γ-axis in FIG. 6B. Accordingly, the fiber optic connector adapter module 110 is inserted into the insertion region 140 at an angle θ with respect to the γ-axis and the installation region 141.

The shape of the adapter opening 102 may depend on the shape and configuration of fiber optic connector adapter module 110. The insertion region 140 should be larger than the installation region 141 such that the fiber optic connector adapter module 110 may be inserted into the insertion region 140 and then rotated such that it contacts a portion of the adapter mount 101 and is restricted from movement in three directions due to the shape of the installation region and/or any retaining mechanisms (e.g., spring clips 130). In the illustrated embodiment, the insertion region 140 of the opening is defined by a first angled edge 107A and a second angled edge 107B. The first and second angled edges 107A, 107B are angled by an angle θ with respect to the γ-axis and are parallel with respect to one another. The first angled edge 107A transitions into a first straight edge 108A that is opposite from the second angled edge 107B, and defines a portion of the installation region 141. The second angled edge 107A transitions into a second straight edge 108B that is opposite from the first angled edge 107A, and defines a portion of the installation region 141. The first and second angled edges 107A, 107B are offset with respect to one another by a distance $w_1$ that defines a width of the insertion region 140. The distance $w_1$ should be greater than a width of the fiber optic connector adapter module 110 such that the fiber optic connector adapter module 110 may pass through the adapter opening 102 at the insertion region 140. The first and second straight edges 108A, 108B are offset with respect to one another by a distance $w_2$ that is smaller than a width of the fiber optic connector adapter module 110.

Positioned at a first end 109A of the exemplary adapter opening 102 (i.e., a top end) are a first notch 106A and a second notch 106B, and positioned at a second end 109B of the adapter opening 102 (i.e., a bottom end) are a third notch 106C and a fourth notch 106D. The first through fourth notches 106A-106D are dimensioned and positioned to receive the first through fourth tabs 116A-116D when the fiber optic connector adapter module 110 is positioned in the insertion region 140. In the illustrated embodiment, the second and third notches 106B, 106C are angled by angle θ with respect to the γ-axis to accommodate the second and third tabs 116B, 116C, respectively. The notches 106A-106D define contact areas 143A-143D that are configured to contact the first through fourth tabs 116A-116D when the fiber optic connector adapter module 110 is positioned in the installation region 141 of the adapter opening 102. Although the first and fourth notches 106A, 106D are larger than the second and third notches 106B, 106C, embodiments are not limited thereto. Further, it should be understood that alternative embodiments may include notches that are positioned in locations other than those depicted in FIG. 6B, and that the placement, configuration and dimensions of the notches may depend on the configuration of the fiber optic connector adapter module 110 intended to be mounted in the adapter mount 101.

Installation of a fiber optic connector adapter module 110 into an adapter opening 102 of an adapter mount 101 will now be described with reference to FIGS. 7A-7C. First, referring to FIG. 7A, the fiber optic connector adapter module 110 is turned by the angle θ with respect to vertical (or another reference orientation, depending on how the adapter mount 101 is installed in the data center enclosure) such that the first, second, third, and fourth tabs 116A-116D defining the engagement features are aligned with the first, second, third and fourth notches 106A-106D of the adapter opening 102, respectively. Referring to FIG. 7B, the fiber optic connector adapter module 110 is moved into the insertion region 140 (see FIG. 6B) such that the tabs 116A-116D are disposed in the respective notches 106A-106D. The fiber optic connector adapter module 110 is then rotated as indicated by arrow B such that it is vertical (or aligned in another reference orientation, depending on how the adapter mount 101 is installed in the data center enclosure), aligned with the γ-axis as shown in FIG. 6, and positioned in the installation region 141 of the adapter opening 102 (FIG. 7C).

Rotation of the fiber optic connector adapter module 110 from the insertion region 140 to the installation region 141 causes the first tab to contact the first contact area 143A of the adapter mount 101, the second tab to contact the second contact area 143B, the third tab to contact the third contact area 143C, and the fourth tab to contact the fourth contact area 143D. Additionally, in the illustrated embodiment, a portion of the first edge 114 of the fiber optic connector adapter module 110 contacts the second surface 103 of the adapter mount 101 proximate to the first straight edge of the adapter opening 102, and a portion of the second edge 118 of the fiber optic connector adapter module 110 contacts the second surface 103 of the adapter mount 101 proximate to the second straight edge of the adapter opening 102.

The areas of the fiber optic connector adapter module 110 that contact the adapter mount 101 as described above may be pressed against the second surface 103 by one or more retention mechanisms. Referring now to FIG. 8, a close-up, perspective view of the second surface 103 of the adapter mount 101 and a top end of an installed fiber optic connector adapter module 110 is illustrated. The second surface 103 of the adapter mount 101 include spring clips as shown in FIG. 6A. The spring clip 130 may include an arm 132 that is offset from the second surface 103 of the adapter mount 101 to receive a tab (e.g., first tab 116A and fourth tab 116D) of the fiber optic connector adapter module 110. In some embodiments, the end 134 of the arm 132 may be outwardly flared to assist in guiding the tab into the gap between the arm 132 and the second surface 103 of the adapter mount 101. The spring clips 130 apply a force to the fiber optic connector adapter module 110 to releasably retain it in the installation region 141 of the adapter opening 102. Referring once again to FIG. 7C, the fiber optic connector adapter module 110 may be rotated in a direction opposite from the direction indicated by arrow B (e.g., a clockwise direction) to remove the tabs (e.g., first and fourth tabs 116A, 116D) from the spring clips 130 such that the fiber optic connector adapter module 110 is in the insertion region 140 where it may be pulled out of the adapter opening 102.

Referring now to FIGS. 9A and 9B, an alternative fiber optic connector adapter module 210 is illustrated. FIG. 9A is a side perspective view of the fiber optic connector adapter module 210, while FIG. 9B provides a side view. Similar to the fiber optic connector adapter module 110 depicted in FIGS. 1, 2A, 2B, 3, 7A-7C, and 8, the fiber optic connector adapter module 210 depicted in FIGS. 9A and 9B include an array of fiber optic connector adapters 208 including an array of first ports 211 and an array of corresponding second ports 212. It should be understood that the first and second ports 211, 212 may take on configurations other than those depicted. The fiber optic connector adapter module 210 further includes a first engagement feature 215A and a second engagement feature 215B extending a length of the fiber optic connector adapter module 210 that define first and second tabs 216A, 216B and third and fourth tabs 216C, 216D, respectively, as described above. Alternatively, more or fewer notches may be provided.

The illustrated fiber optic connector adapter module 210 includes an additional engagement plate 250 that is offset from the first and second engagement features 215A, 215B. Accordingly, a gap g is present between the engagement plate 250 and the first engagement feature 215A, and between the engagement plate 250 and the second engagement feature 215B. The engagement plate 250 contacts a first surface 104 of the adapter mount 101, while the first and second engagement features 215A, 215B contact the second surface 103 of the adapter mount 101.

FIGS. 10A-10B depict the installation of the fiber optic connector adapter module 210 into the adapter opening 102 of the adapter mount 101. The adapter mount 101 is the same adapter mount 101 that is depicted in FIGS. 7A-7C. First, referring to FIG. 10A, the fiber optic connector adapter module 210 is turned by the angle $\theta$ with respect to vertical (or another reference orientation, depending on how the adapter mount 101 is installed in the data center enclosure) such that the first, second, third, and fourth tabs 116A-116D (not visible in FIGS. 10A-10C) are aligned with the first, second, third and fourth notches 106A-106D of the adapter opening 102, respectively. Referring to FIG. 10B, the fiber optic connector adapter module 110 is moved into the insertion region 140 such that the tabs 116A-116D are disposed in the respective notches 106A-106D. The fiber optic connector adapter module 110 is then rotated as indicated by arrow B such that it is vertical (or aligned in another reference orientation, depending on how the adapter mount 101 is installed in the data center enclosure), aligned with the $\gamma$-axis as shown in FIG. 6, and positioned in the installation region 141 of the adapter opening 102 (FIG. 10C). The engagement plate 250 contacts the first surface 104 of the adapter mount 101, while the first through fourth tabs 216A-216D contact the second surface 103 of the adapter mount 101 (e.g., as described above with respect to FIGS. 7B, 7C and 8). Accordingly, portions of the adapter mount 101 are disposed within the gaps g defined by the engagement plate 250 and the first and second engagement features 215A, 215B.

Figure 11:
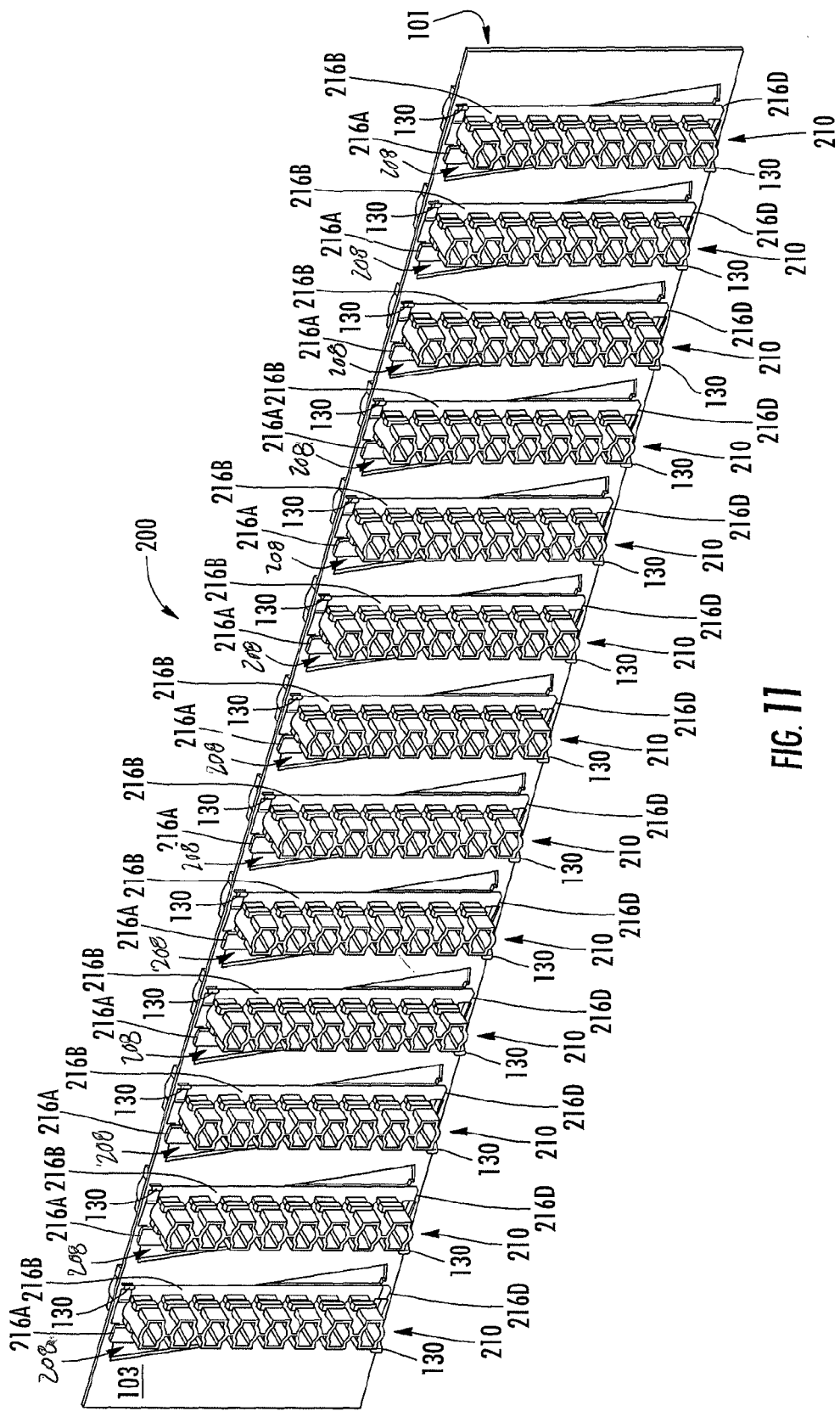
FIG. 11 is a rear perspective view of a fiber optic connector adapter module assembly comprising a plurality of fiber optic connector adapter modules as depicted in FIGS. 9A and 9B.
Figure 12:
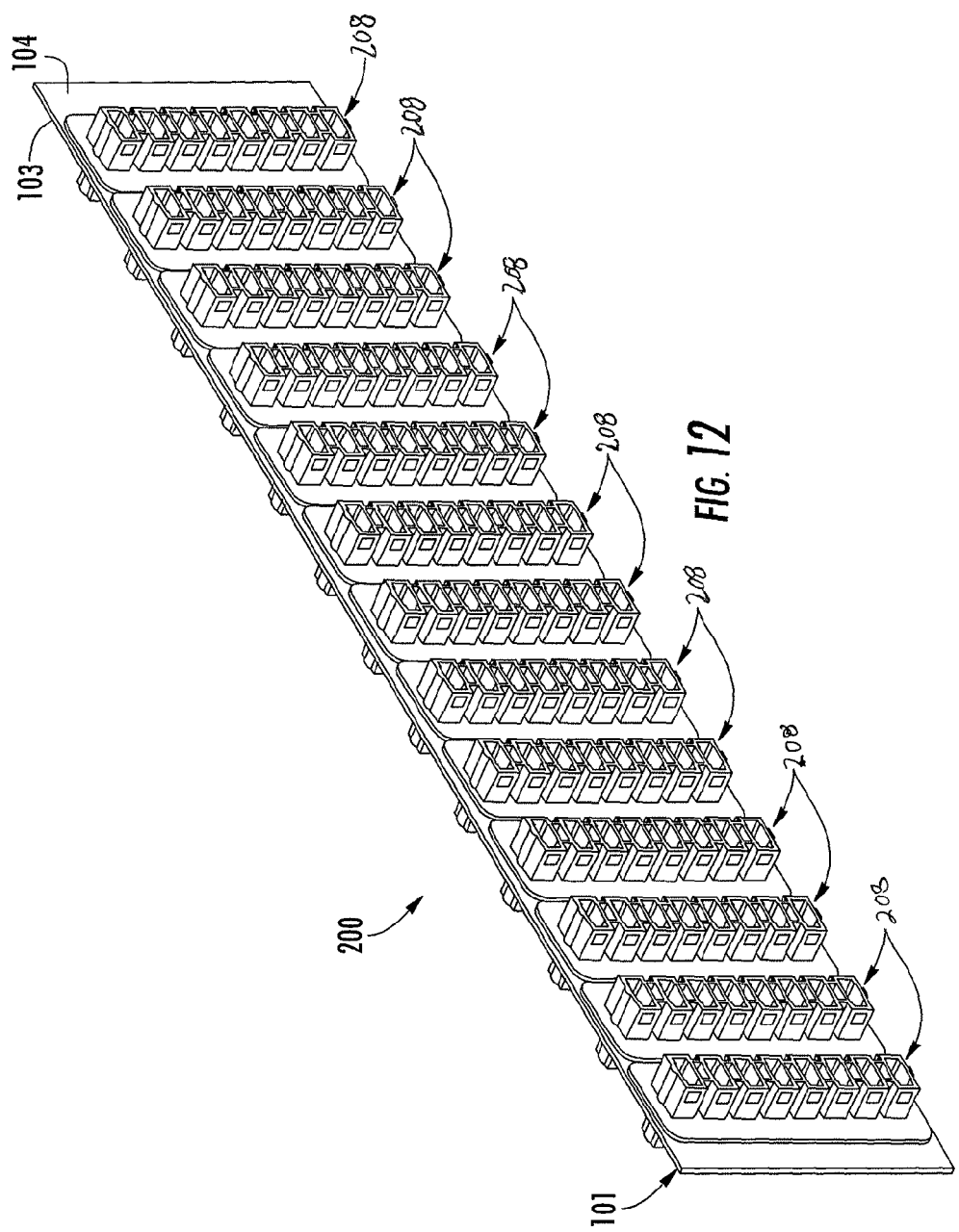
FIG. 12 is a front perspective view of the fiber optic connector adapter module assembly depicted in FIG. 11.

In some embodiments, the fiber optic connector adapter module 210 may be retained in the installation region 141 of the adapter opening 102 by an interference fit of the adapter mount 101 within the gap g between the engagement plate 250 and the first and second engagement features 215A, 215B. Therefore, separate retention mechanisms (e.g., the spring clips 130 described above) may not be needed in such embodiments. However, one or more retention mechanisms may be utilized in embodiments. FIG. 11 depicts the second surface 103 of a populated adapter mount 101 defining a fiber optic connector adapter module assembly 200. In the illustrated embodiment, two spring clips 130 are used to retain each fiber optic connector adapter module 210, such as described above with reference to FIG. 8. FIG. 12 depicts the first surface 104 of the populated adapter mount 101 depicted in FIG. 11.

In some embodiments, the first and second engagement features 215A, 215B and/or the engagement plate 250 may include tapers or ribs to insure a tight interference fit with the adapter mount 101, as well as to accommodate different adapter mount thicknesses without requiring different fiber optic connector adapter module designs. FIGS. 13A and 13B depict a fiber optic connector adapter module 210 having two rib features 217 on each of the first and second engagement features 215A, 215B to insure a tight interference fit with the adapter mount 101.

Figure 14A:
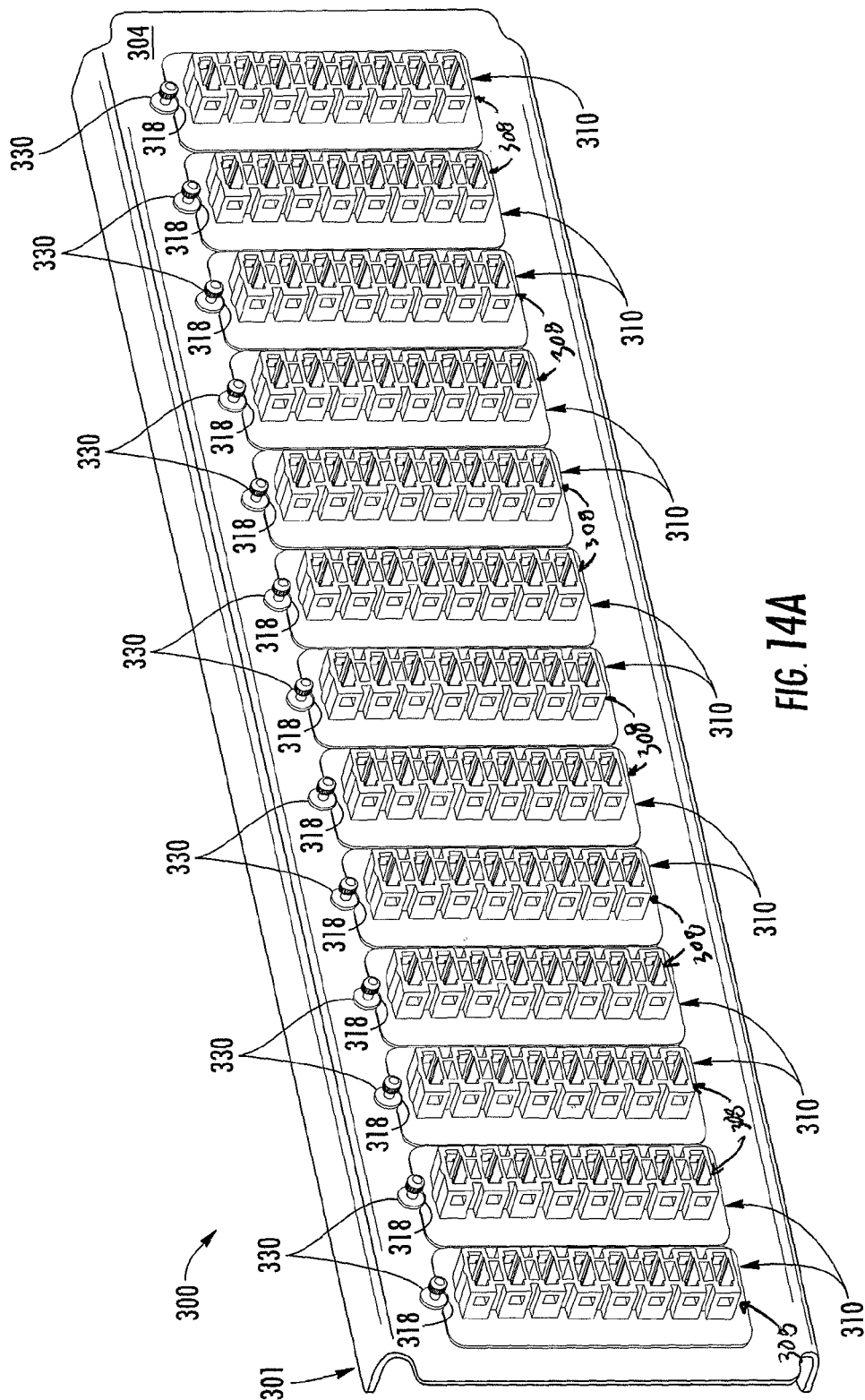
FIG. 14A is a front perspective view of a fiber optic connector adapter module assembly utilizing locking pegs as retention mechanisms according to one or more embodiments described and illustrated herein.

Retention mechanisms other than the spring clips 130 described above may be utilized in embodiments. FIGS. 14A and 14B depict a fiber optic connector adapter module assembly 300 that utilizes a locking peg 330 as the retention mechanism. FIG. 14A is a front perspective view of a populated adapter mount 301, while FIG. 14B is a close-up view of a top portion of a fiber optic connector adapter module 310 and a locking peg 330. The illustrated fiber optic connector adapter module assembly 300 generally comprises an adapter mount 301, which may be configured as described above, and a plurality of fiber optic connector adapter modules 310 having an engagement plate 350 as describe above with reference to FIGS. 9A-12.

Referring briefly to FIG. 15A, the adapter mount 301 includes a lock opening 335 located above each adapter opening 102 configured to receive a locking peg 330. Referring once again to FIGS. 14A and 14B, each fiber optic connector adapter module 310 includes an opening 318 to accept the locking peg 330. Each fiber optic connector adapter module 310 includes an array of fiber optic connector adapters 308 defined by first and second ports 311, 312. In the illustrated embodiment, the opening 318 is configured as a notch in the top end of the engagement plate 350. When installed, the locking peg 330 prevents rotation of the fiber optic connector adapter module 310 from the installation region 141 of the adapter opening 102. Although the opening 318 is illustrated as a notch in the present example, it may also be configured as a through-hole in alternative embodiments.

As shown in FIG. 14B, the locking peg may have a base 332 that matches the diameter of the opening 318 in the engagement plate 350 to prevent rotation of the fiber optic connector adapter module 310. The illustrated embodiment includes a trunk portion 334 and an upper portion 336 that is configured to be handled by a user. As an example and not a limitation, the upper portion 336 may include a texture, such as a knurl and the like, to assist the user in operating the locking peg 330. The locking peg 330 may be retained in the lock opening 335 by an interference fit, a snap fit, screw-fit (e.g., the locking peg 330 and the lock opening may be threaded), etc.

Installation of a fiber optic connector adapter module 310 into the adapter opening 102 of an adapter mount 301 using a locking peg 330 will now be described with reference to FIGS. 15A-15D. First, referring to FIG. 15A, the fiber optic connector adapter module 310 is turned by the angle θ with respect to vertical (or another reference orientation, depending on how the adapter mount 301 is installed in the data center enclosure) such that the first, second, third, and fourth tabs (not visible in FIGS. 15A-15D) are aligned with the first, second, third and fourth notches 106A-106D of the adapter opening 102, respectively. Referring to FIG. 15B, the fiber optic connector adapter module 310 is moved into the insertion region 140 such that the tabs 116A-116D are disposed in the respective notches 106A-106D. The fiber optic connector adapter module 310 is then rotated as indicated by arrow B such that it is vertical (or aligned in another reference orientation, depending on how the adapter mount 301 is installed in the data center enclosure), aligned with the γ-axis as shown in FIG. 6, and positioned in the installation region 141 of the adapter opening 102 (FIG. 15C). When the fiber optic connector adapter module 310 is positioned in the installation region 141, the opening 318 (the notch in the present example) is vertically aligned with the lock opening 335. The engagement plate 350 contacts the first surface 104 of the adapter mount 301, while the first through fourth tabs (not shown) contact the second surface 103 of the adapter mount 101 (e.g., as described above with respect to FIGS. 7B, 7C, 8 and 10A-10C). Once the fiber optic connector adapter module 310 is positioned in the installation region 141, the locking peg 330 may be inserted into the lock opening 335 such that it is also disposed in the opening 318 of the engagement plate 350 as shown in FIG. 15D, thereby preventing rotation of the fiber optic connector adapter module 310 in the adapter opening 102 of the adapter mount 301.

Referring now to FIGS. 16A, 16B, 17 and 18A-18C a fiber optic connector adapter module 410 and an adapter mount 401 of an exemplary fiber optic connector adapter module assembly 400 are illustrated. Generally the illustrated fiber optic connector adapter module 410 is installed in an adapter opening 402 by a linear translation rather than a rotational movement as described above.

Figure 16A:
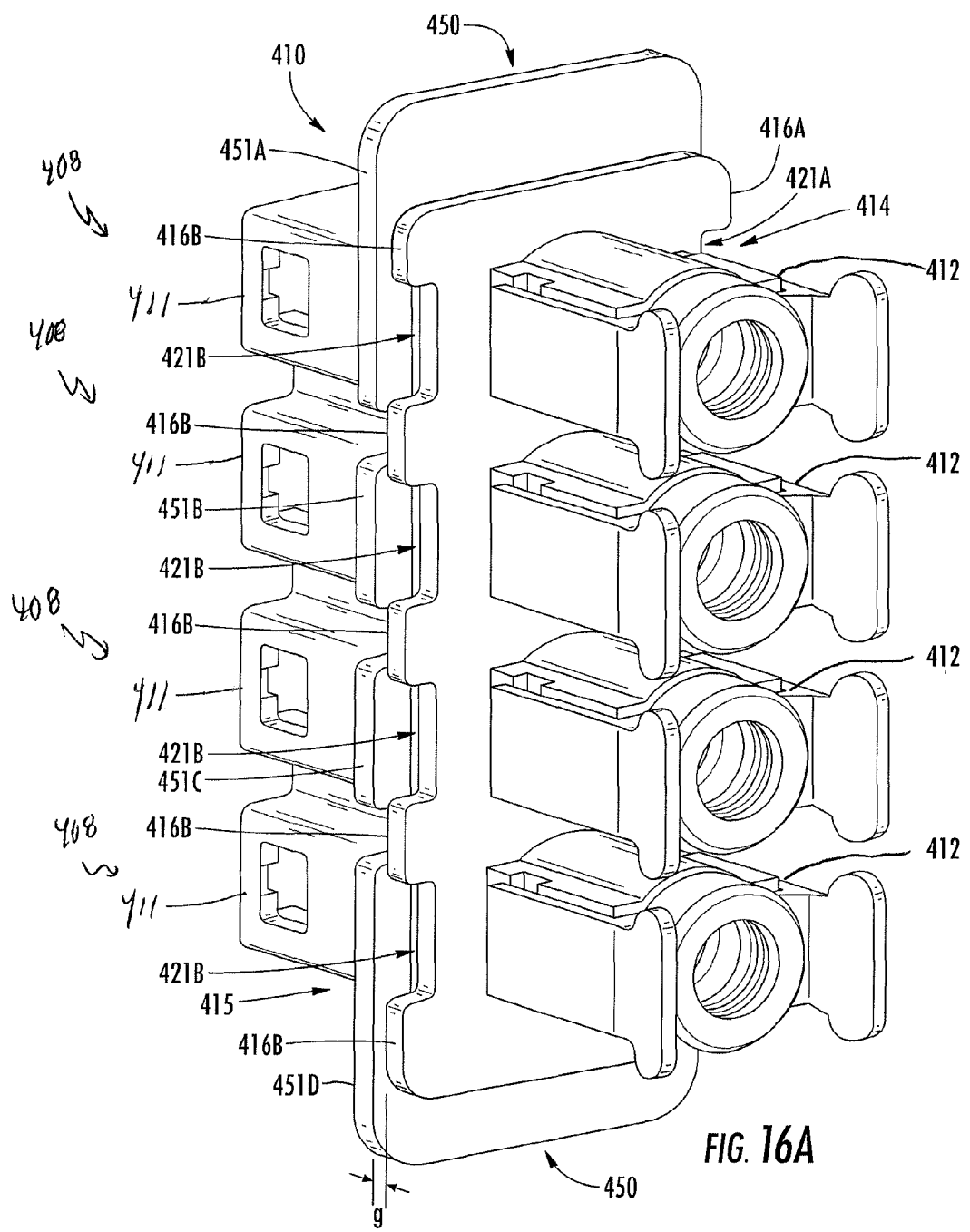
FIG. 16A is a rear perspective view of an exemplary fiber optic connector adapter module configured for linear insertion into an adapter opening of an adapter mount.
Figure 16B:
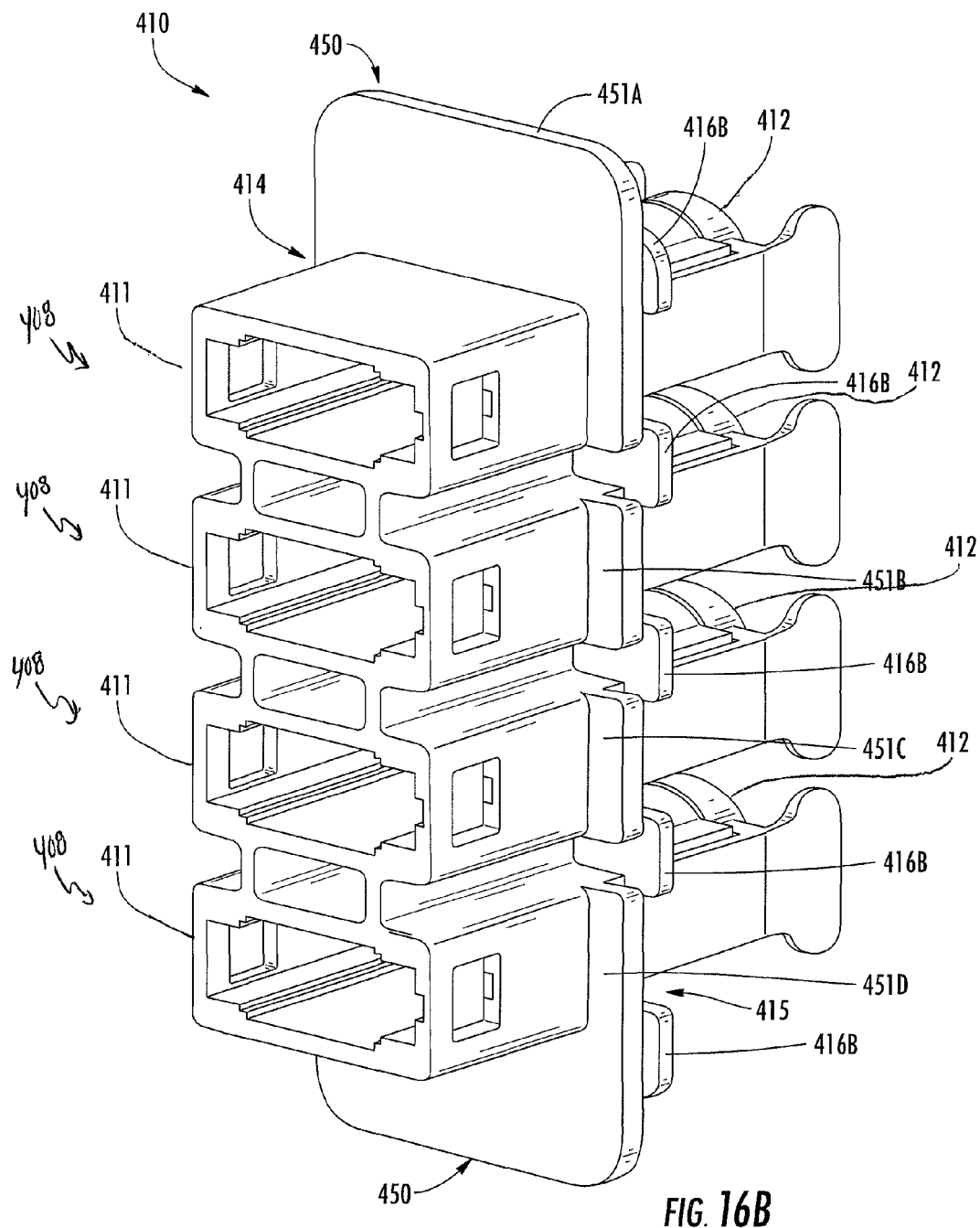
FIG. 16B is a front perspective view of the fiber optic connector adapter module depicted in FIG. 16A.
Figure 16C:
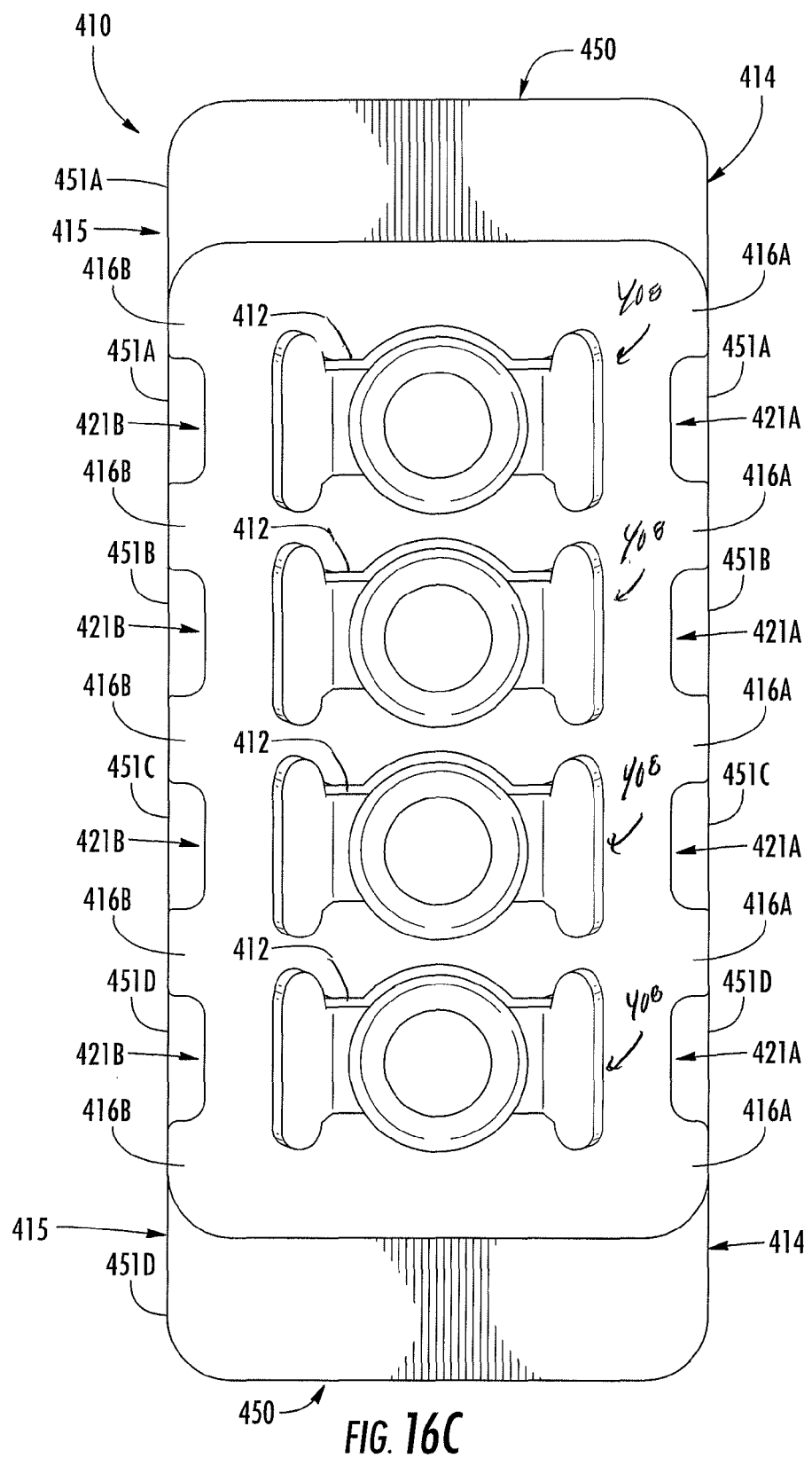
FIG. 16C is a rear view of the fiber optic connector adapter module depicted in FIG. 16A.

FIGS. 16A-16C depict a rear perspective view, a front perspective view, and a rear view of an exemplary fiber optic connector adapter module 410, respectively. As described in more detail below, the illustrated fiber optic connector adapter module 410 is configured to be inserted into an adapter opening 402 and linearly translated to be shifted into an installed region and retained to an adapter mount 401. The fiber optic connector adapter module 410 includes an array of fiber optic connector adapters 408 including first ports 411 and a second ports 412. It should be understood that the first and second ports 411, 412 may take on configurations other than those depicted. Further, embodiments described herein are not limited to the number of first and second ports 411, 412 depicted in FIGS. 16A-16C.

The illustrated fiber optic connector adapter module 410 includes a plurality of first engagement tabs 416A along a first edge 414, and a plurality of second engagement tabs 416B along a second edge 415. The first and second engagement tabs 416A, 416B are separated by first and second engagement notches 421A, 421B, respectively. As shown in FIGS. 16A-16C, the first and second engagement tabs 416A, 416B may be disposed on the same side of the fiber optic connector adapter module 410 as the second ports 412. However, in alternative embodiments, the first and second engagement tabs 416A, 416B may be disposed on the same side of the fiber optic connector adapter module 410 as the first ports 411. Although the first and second engagement tabs 416A, 416B are depicted as generally rectangular, embodiments are not limited thereto. For example, the first and second engagement tabs 416A, 416B may be triangular in shape, semi-circular, etc. Any number of first and second engagement tabs 416A, 416B may be provided, and the number of first engagement tabs 416A may be different than the number of second engagement tabs 416B.

The fiber optic connector adapter module 410 further includes an engagement plate 450 that is offset from the plurality of first and second engagement tabs 416A, 416B such that a gap g is present between an inner surface of the engagement plate 450 and an inner surface of the first and second engagement tabs 416A, 416B. As described in more detail below, the gap g may have a width that is substantially equal to a thickness of the adapter mount 401 such that the inner surfaces of the engagement plate 450, the plurality of first engagement tabs 416A and the plurality of second engagement tabs 416B contact a first and second surface 404, 404 of the adapter mount 401. In the illustrated embodiment, the engagement plate 450 comprises a plurality of sections 451A-451D. However, in other embodiments, the engagement plate 450 may not have individual sections, and configured such as the engagement plate depicted in FIGS. 9A and 9B.

Figure 17:
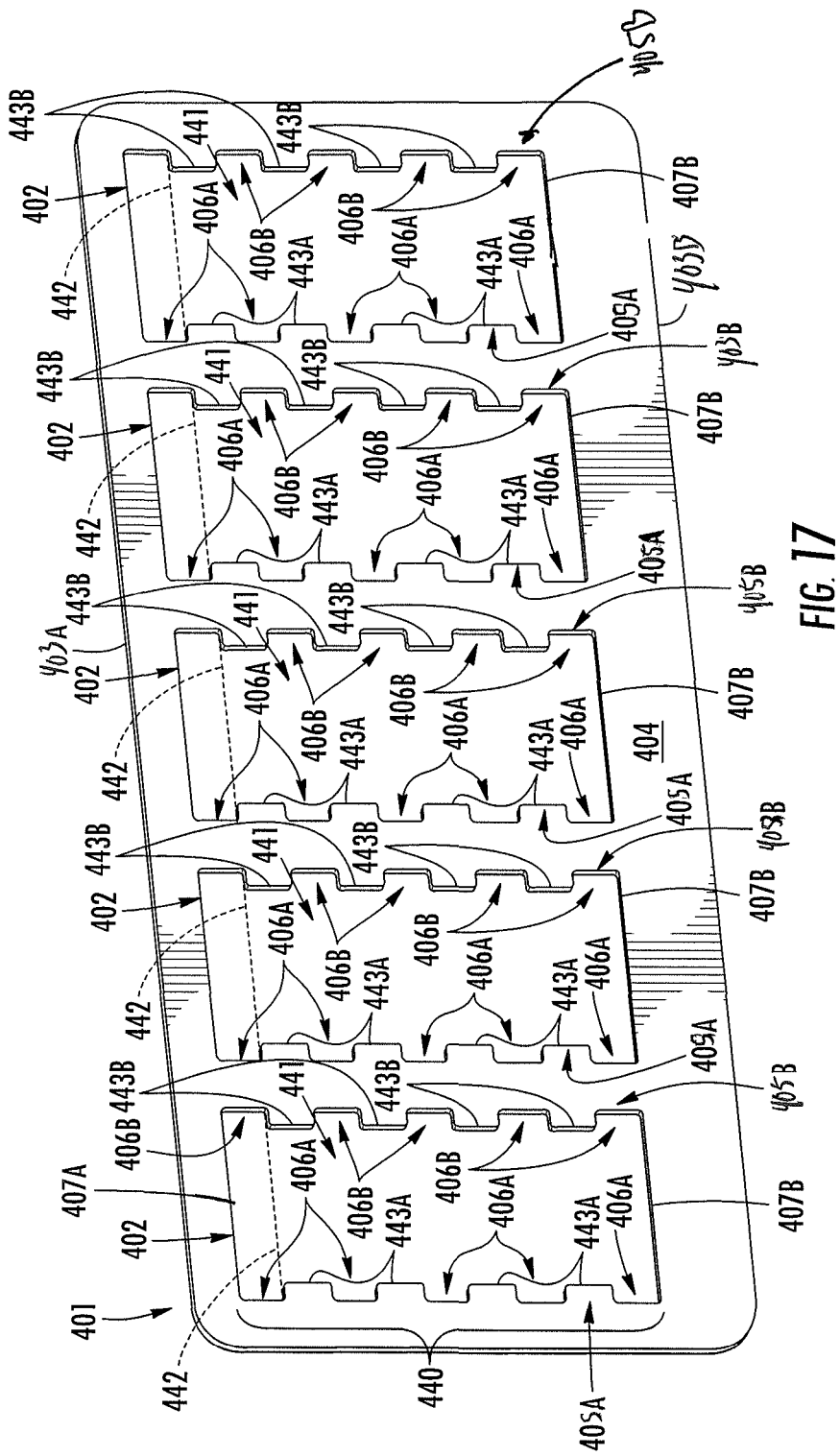
FIG. 17 is a perspective view of an exemplary adapter mount configured to accept the fiber optic connector adapter module depicted in FIGS. 16A-16C.

Referring now to FIG. 17, an exemplary adapter mount 401 comprising a plurality of adapter openings configured to receive a plurality of fiber optic connector adapter modules 410 is depicted. Each adapter opening 402 has a first edge 405A defined by a plurality of first alternating tabs 443A and notches 406A and an opposing second edge 405B defined by a plurality of second alternating tabs 443B and notches 406B. Each adapter opening 402 further includes a top edge 407A and an opposing bottom edge 407B. Any number of adapter openings 402 may be provided in the adapter mount 401.

Each adapter opening 402 defines an insertion region 440 that extends from the top edge 407A to the bottom edge 407B and between the first and second edges 405A, 405B. Each adapter opening 402 also defines an installation region 441 that overlaps, and is smaller than, the insertion region 440. The installation region 441 extends from the dashed line 442 to the bottom edge 407B and between the first and second edges 405A, 405B. The first and second notches 406A, 406B are dimensioned and positioned to accept the first and second engagement tabs 416A, 416B. Accordingly, the shape of the first and second notches 406A, 406B correspond to the shape of the first and second engagement tabs 416A, 416B. The first and second notches 406A, 406B may be slightly larger in area than the first and second engagement tabs 416A, 416B so that they may receive the first and second engagement tabs 416A, 416B.

The first and second tabs 443A, 443B of the adapter opening 402 are positioned between the first and second notches 406A, 406B and are configured to contact the first and second engagement tabs 416A, 416B when the fiber optic connector adapter module 410 is positioned in the installation region 441 of the adapter opening 402. It should be understood that the first and second tabs 443A, 443B may take on shapes other than the rectangular shape depicted in FIG. 17.

Figure 18A:
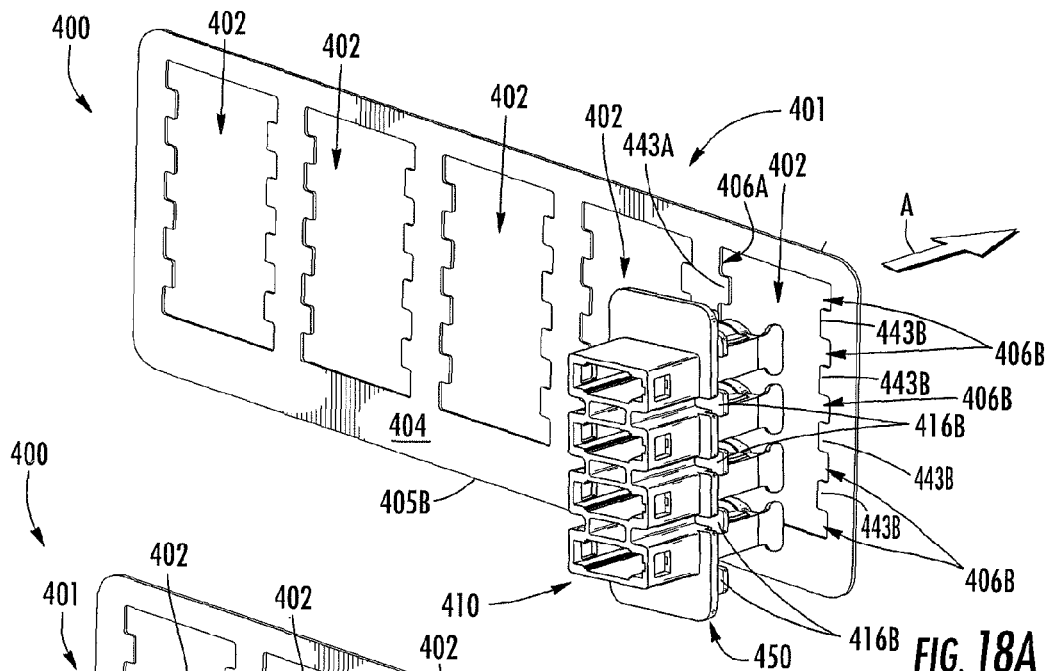
FIGS. 18A-18C are perspective views of an installation of the fiber optic connector adapter module depicted in FIGS. 16A-16C into the adapter mount depicted in FIG. 17.
Figure 18B:
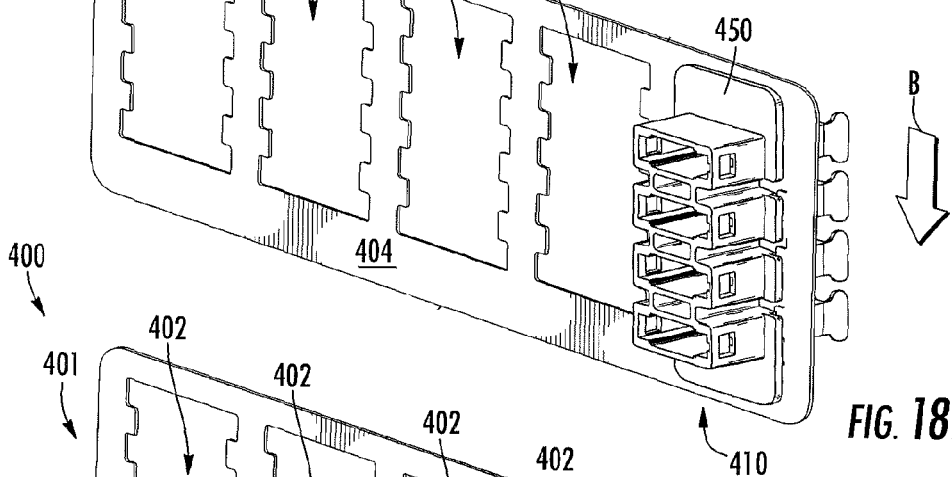
Figure 18C:
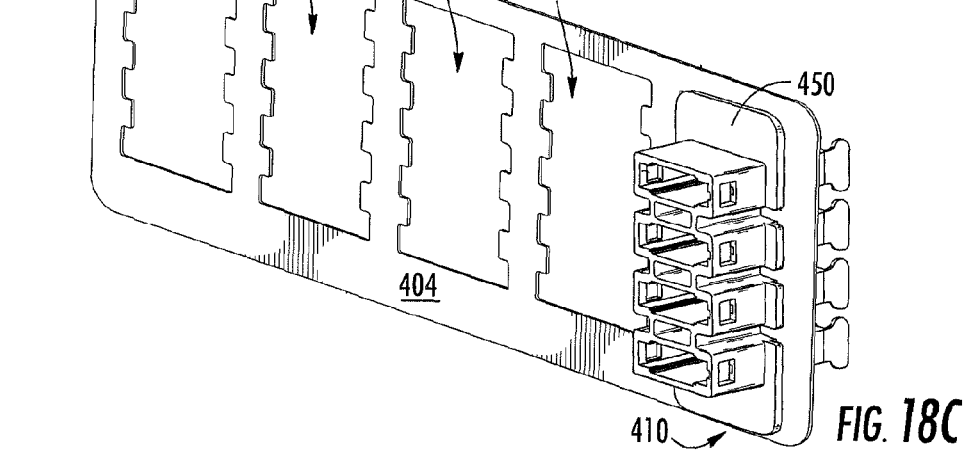

FIGS. 18A-18C depict installation of the fiber optic connector adapter module 410 shown in FIGS. 16A-16C into the adapter mount 401 shown in FIG. 17. Referring initially to FIG. 18, the fiber optic connector adapter module 410 is positioned such that the first and second engagement tabs 416A, 416B face the adapter mount 401 and are aligned with the first and second notches 406A, 406B of the adapter opening 402. Additionally, the first and second tabs 443A, 443B of the adapter opening 402 are aligned with the first and second engagement notches 421A, 421B of the fiber optic connector adapter module 410. The fiber optic connector adapter module 410 is then pushed into the adapter opening 402 in a direction indicated by arrow A.

Referring now to FIG. 18B, the fiber optic connector adapter module 410 is depicted as being positioned in the insertion region 440 of the adapter opening 402. The plurality of first and second engagement tabs 416A, 416B are disposed within the plurality of first and second notches 406A, 406B. To releaseably secure the fiber optic connector adapter module 410 to the adapter mount 401, the fiber optic connector adapter module 410 is moved downward (or in another direction, depending on how the adapter mount is positioned) toward the installation region 441 as indicated by arrow B to linearly translate the fiber optic connector adapter module 410 from the insertion region 440 to the installation region 441 (see FIG. 17). FIG. 18C depicts the fiber optic connector adapter module 410 disposed in the installation region 441 of the adapter opening 402. In this position, the plurality of first and second tabs 443A, 443B of the adapter opening 402 are disposed between the engagement plate 450 and the plurality of first and second engagement tabs 416A, 416B of the fiber optic connector adapter module 410. The fiber optic connector adapter module 410 may be secured to the adapter mount 401 by an interference fit between the plurality of first and second tabs 443A, 443B of the adapter opening 402, and the engagement plate 450 and the plurality of first and second engagement tabs 416A, 416B of the fiber optic connector adapter module 410. One or more retention mechanisms may be provided to secure the fiber optic connector adapter module 410 to the adapter mount 401 in some embodiments (e.g., the retentions mechanisms described above).

It should now be understood that embodiments of the present disclosure may enable quick installation of ganged fiber optic connector adapter modules into data center enclosures without requiring tools. Fiber optic connector adapter modules may be installed into an adapter mount by a twist-and-lock motion or a linear translation motion. The fiber optic connector adapter modules may be retained in the adapter mount by one or more retention mechanisms in some embodiments.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

The invention claimed is:

1. A fiber optic connector adapter module assembly comprising:
   a fiber optic connector adapter module comprising a plurality of fiber optic connector adapters, wherein each of the fiber optic connector adapters of the array has a first port; and
   an adapter mount comprising an adapter opening, the adapter opening comprising an insertion region and an installation region, wherein the insertion region and the installation region are shaped such that the insertion region is larger than the installation region, and the insertion region is configured to receive the fiber optic connector adapter module; and
   at least one retention mechanism coupled to the adapter mount, wherein the installation region of the adapter mount and the at least one retention mechanism cooperate to releasably lock the fiber optic connector adapter module in the insertion region upon rotation of the fiber optic connector adapter module from the insertion region into the installation region of the adapter opening, the at least one retention mechanism comprising:
      a first spring clip coupled to a second surface of the adapter mount at a location proximate a first end of the adapter opening, wherein the first spring clip forces a first end of the fiber optic connector adapter module against the second surface of the adapter mount when the fiber optic connector adapter module is positioned within the installation region; and
      a second spring clip coupled to the second surface of the adapter mount at a location proximate a second end of the adapter opening, wherein the second spring clip forces a second end of the fiber optic connector adapter module against the second surface of the adapter mount when the fiber optic connector adapter module is positioned within the installation region.

2. The fiber optic connector adapter module assembly of claim 1, wherein a ferrule element is disposed within each first port and is configured to mate with at least a fiber optic connector inserted into the first port.

3. The fiber optic connector adapter module assembly of claim 1, wherein the insertion region is angled with respect to the installation region.

4. A fiber optic connector adapter module assembly comprising:
   a fiber optic connector adapter module comprising:
      a first end;
      a second end;

an array of fiber optic connector adapters, wherein each of the fiber optic connector adapters of the array has a first port;

at least one first engagement feature extending from the first end of the fiber optic connector adapter module; and at least one second engagement feature extending from the second end of the fiber optic connector adapter module;

an adapter mount comprising:
   a first surface;
   a second surface that is opposite from the first surface;
   an adapter opening comprising:
      an insertion region shaped to accept the fiber optic connector adapter module such that the at least one first engagement feature and the at least one second engagement feature may pass through the adapter opening;
      an installation region shaped such that the at least one first engagement feature and the at least one second engagement feature contact the second surface of the adapter mount when the fiber optic connector adapter module is positioned within the installation region, thereby preventing the fiber optic connector adapter module from passing through the adapter opening; and at least one retention mechanism configured to retain the fiber optic connector adapter module in the installation region of the adapter mount, the at least one retention mechanism comprising:
   a first spring clip coupled to the second surface of the adapter mount at a location proximate a first end of the adapter opening, wherein the first spring clip forces the at least one first engagement feature against the second surface of the adapter mount when the fiber optic connector adapter module is positioned within the installation region; and
   a second spring clip coupled to the second surface of the adapter mount at a location proximate a second end of the adapter opening, wherein the second spring clip forces the at least one second engagement feature against the second surface of the adapter mount when the fiber optic connector adapter module is positioned within the installation region.

5. A fiber optic connector adapter module assembly comprising:
   a fiber optic connector adapter module comprising:
      a first end;
      a second end;
      an array of fiber optic connector adapters, wherein each of the fiber optic connector adapters of the array has a first port;
      at least one first engagement feature extending from the first end of the fiber optic connector adapter module; and
      at least one second engagement feature extending from the second end of the fiber optic connector adapter module;
   an adapter mount comprising:
      a first surface;
      a second surface that is opposite from the first surface;
      an adapter opening comprising:
         an insertion region shaped to accept the fiber optic connector adapter module such that the at least one first engagement feature and the at least one second engagement feature may pass through the adapter opening;
         an installation region shaped such that the at least one first engagement feature and the at least one second engagement feature contact the second surface of the adapter mount when the fiber optic connector adapter module is positioned within the installation region, thereby preventing the fiber optic connector adapter module from passing through the adapter opening; and
      at least one retention mechanism configured to retain the fiber optic connector adapter module in the installation region of the adapter mount;
   wherein:
      the at least one first engagement feature comprises a first tab extending from the first end of the fiber optic connector adapter module proximate a first edge of the fiber optic connector adapter module and a second tab extending from the first end of the fiber optic connector adapter module proximate a second edge of the fiber optic connector adapter module;
      the at least one second engagement feature comprises a third tab extending from the second end of the fiber optic connector adapter module proximate the first edge of the fiber optic connector adapter module and a fourth tab extending from the second end of the fiber optic connector adapter module proximate the second edge of the fiber optic connector adapter module; and
      the adapter opening comprises:
         a first notch located to receive the first tab of the fiber optic connector adapter module when the fiber optic connector adapter module is positioned in the insertion region;
         a second notch located to receive the second tab of the fiber optic connector adapter module when the fiber optic connector adapter module is positioned in the insertion region;
         a third notch located to receive the third tab of the fiber optic connector adapter module when the fiber optic connector adapter module is positioned in the insertion region; and
         a fourth notch located to receive the fourth tab of the fiber optic connector adapter module when the fiber optic connector adapter module is positioned in the insertion region.

6. The fiber optic connector adapter module assembly of claim 5, wherein the at least one retention mechanism comprises:
   a first spring clip coupled to the second surface of the adapter mount at a location proximate the first notch of the adapter opening, wherein the first spring clip forces the first tab against the second surface of the adapter mount when the fiber optic connector adapter module is positioned within the installation region; and
   a second spring clip coupled to the second surface of the adapter mount at a location proximate the fourth notch of the adapter opening, wherein the second spring clip forces the fourth tab against the second surface of the adapter mount when the fiber optic connector adapter module is positioned within the installation region.

7. A method of installing a fiber optic connector adapter module in a data center enclosure, the fiber optic connector adapter module comprising an array of fiber optic connector adapters, and the method comprising:
   positioning the fiber optic connector adapter module into an insertion region of an adapter opening provided in an adapter mount within the data center enclosure, wherein the insertion region of the adapter opening is larger than an area of the fiber optic connector adapter module;

moving the fiber optic connector adapter module within the adapter opening to transition the fiber optic connector adapter module from the insertion region of the adapter opening to an installation region of the adapter opening, wherein the installation region is smaller than the area defined by the area of the fiber optic connector adapter module; and engaging at least a portion of the fiber optic connector adapter module with at least one retention mechanism that releasably retains the fiber optic connector adapter module in the installation region of the adapter opening, wherein the at least one retention mechanism comprises:

a first spring clip coupled to a second surface of the adapter mount at a location proximate a first end of the adapter opening, wherein the first spring clip forces a first end of the fiber optic connector adapter module against the second surface of the adapter mount when the fiber optic connector adapter module is positioned within the installation region; and a second spring clip coupled to the second surface of the adapter mount at a location proximate a second end of the adapter opening, wherein the second spring clip forces a second end of the fiber optic connector adapter module against the second surface of the adapter mount when the fiber optic connector adapter module is positioned within the installation region.

8. The method of claim 7, wherein moving the fiber optic connector adapter module comprises rotating the fiber optic connector adapter module from the insertion region of the adapter opening to the installation region of the adapter opening.

9. The method of claim 7, wherein moving the fiber optic connector adapter module comprises linearly translating the fiber optic connector adapter module from the insertion region of the adapter opening to the installation region of the adapter opening.

* * * * *